US008694256B2

(12) United States Patent
Cleland et al.

(10) Patent No.: US 8,694,256 B2
(45) Date of Patent: Apr. 8, 2014

(54) STREETLIGHT MONITORING AND CONTROL

(71) Applicant: LED Roadway Lighting Ltd., Halifax, Nova Scotia (CA)

(72) Inventors: Donald A. Cleland, Victoria (CA); Pratibha Sharma, Victoria (CA); Simon H. Lightbody, Victoria (CA); Velvet Warrior, North Saanich (CA)

(73) Assignee: LED Roadway Lighting Ltd. (CA)

( * ) Notice: Subject to any disclaimer, the term of this patent is extended or adjusted under 35 U.S.C. 154(b) by 0 days.

(21) Appl. No.: 13/652,863

(22) Filed: Oct. 16, 2012

(65) Prior Publication Data

US 2013/0038221 A1 Feb. 14, 2013

Related U.S. Application Data

(63) Continuation of application No. 11/899,841, filed on Sep. 7, 2007, now Pat. No. 8,290,710.

(51) Int. Cl.
*G01W 1/12* (2006.01)
*G06F 11/00* (2006.01)

(52) U.S. Cl.
USPC ............. 702/4; 315/119; 315/158; 315/244; 702/64; 702/188

(58) Field of Classification Search
USPC ........... 702/57, 60, 62, 64, 65, 117, 178, 116, 702/187, 188; 315/119, 149, 158, 244; 362/276
See application file for complete search history.

(56) References Cited

U.S. PATENT DOCUMENTS

| | | | |
|---|---|---|---|
| 3,894,265 A | 7/1975 | Holmes et al. | |
| 3,989,976 A | 11/1976 | Tabor | |
| 4,082,981 A | 4/1978 | Morton et al. | |
| 4,350,930 A | 9/1982 | Peil et al. | |
| 4,516,056 A | 5/1985 | Cote | |
| 4,615,009 A | 9/1986 | Battocletti et al. | |
| 4,642,525 A | 2/1987 | Widmayer | |
| 4,647,763 A | 3/1987 | Blake | |
| 4,675,579 A | 6/1987 | Hardy et al. | |

(Continued)

FOREIGN PATENT DOCUMENTS

| | | |
|---|---|---|
| EP | 0067011 A2 | 12/1982 |
| EP | 0447136 A2 | 9/1991 |

(Continued)

OTHER PUBLICATIONS

Public Works; Lighting street lighting; The 1996 Public Works Manual; Streets and Highways; Apr. 15, 1996; Dailog; pp. 1-7.

(Continued)

*Primary Examiner* — John H Le
(74) *Attorney, Agent, or Firm* — Stevens & Showalter LLP

(57) ABSTRACT

A system and method for streetlight control is provided. A lamp sensor inside a reflector of the streetlight is utilized to detect the output of a lamp of the streetlight. During daytime periods when the lamp is OFF, the lamp sensor is utilized to act as a day/night sensor by detecting ambient light near the lamp. When the ambient light level falls below a sufficient level indicative that night is approaching the lamp is turned ON and the lamp sensor utilized to detect the lamp output of the streetlight.

20 Claims, 13 Drawing Sheets

(56) References Cited

U.S. PATENT DOCUMENTS

| | | |
|---|---|---|
| 4,731,551 A | 3/1988 | Gibbs et al. |
| 4,777,607 A | 10/1988 | Maury et al. |
| 4,931,701 A | 6/1990 | Carl |
| 4,933,607 A | 6/1990 | Vogel |
| 4,980,806 A | 12/1990 | Taylor et al. |
| 4,994,718 A | 2/1991 | Gordin |
| 5,004,957 A | 4/1991 | Cunningham |
| 5,216,333 A | 6/1993 | Nuckolls et al. |
| 5,235,252 A | 8/1993 | Blake |
| 5,266,807 A | 11/1993 | Neiger |
| 5,327,048 A | 7/1994 | Troy |
| 5,336,976 A | 8/1994 | Webb et al. |
| 5,406,176 A | 4/1995 | Sugden |
| 5,451,843 A | 9/1995 | Kahn et al. |
| 5,495,329 A | 2/1996 | Anderson, II et al. |
| 5,701,058 A | 12/1997 | Roth |
| 5,751,116 A | 5/1998 | Thomas et al. |
| 5,902,994 A | 5/1999 | Lisson et al. |
| 5,962,988 A | 10/1999 | Nuckolls et al. |
| 5,962,991 A | 10/1999 | Levy |
| 6,031,340 A | 2/2000 | Brosius |
| 6,035,266 A | 3/2000 | Williams et al. |
| 6,057,674 A | 5/2000 | Bangerter |
| 6,114,816 A | 9/2000 | Nuckolls et al. |
| 6,119,076 A | 9/2000 | Williams et al. |
| 6,191,568 B1 | 2/2001 | Poletti |
| 6,204,615 B1 | 3/2001 | Levy |
| 6,316,923 B1 | 11/2001 | Poletti |
| 6,337,001 B1 | 1/2002 | Haag et al. |
| 6,359,555 B1 | 3/2002 | Williams |
| 6,370,489 B1 | 4/2002 | Williams et al. |
| 6,393,381 B1 | 5/2002 | Williams et al. |
| 6,393,382 B1 | 5/2002 | Williams et al. |
| 6,393,608 B1 | 5/2002 | Pulford et al. |
| 6,415,245 B2 | 7/2002 | Williams et al. |
| 6,441,565 B1 | 8/2002 | Levy |
| 6,452,339 B1 | 9/2002 | Morrissey et al. |
| 6,456,373 B1 | 9/2002 | Wienecke et al. |
| 6,456,960 B1 | 9/2002 | Williams et al. |
| 6,548,967 B1 | 4/2003 | Dowling et al. |
| 6,577,075 B2 | 6/2003 | Romano et al. |
| 6,604,062 B2 | 8/2003 | Williams et al. |
| 6,631,063 B2 | 10/2003 | Ortiz et al. |
| 6,677,814 B2 | 1/2004 | Low et al. |
| 6,704,301 B2 | 3/2004 | Chari et al. |
| 6,714,895 B2 | 3/2004 | Williams et al. |
| 6,791,284 B1 | 9/2004 | Levy |
| 6,807,516 B2 | 10/2004 | Williams et al. |
| 6,841,944 B2 | 1/2005 | Morrissey et al. |
| 6,856,101 B1 | 2/2005 | Hitchcock |
| 6,889,174 B2 | 5/2005 | Williams et al. |
| 6,892,168 B2 | 5/2005 | Williams et al. |
| 6,956,336 B2 | 10/2005 | Ribarich |
| 6,965,575 B2 | 11/2005 | Srikrishna et al. |
| 7,034,466 B2 | 4/2006 | Tsao |
| 7,045,968 B1 | 5/2006 | Bierman et al. |
| 7,050,808 B2 | 5/2006 | Janusz et al. |
| 7,168,822 B2 | 1/2007 | Abramovich et al. |
| 7,355,726 B2 | 4/2008 | Jeffers et al. |
| 7,653,010 B2 | 1/2010 | Ensor et al. |
| 8,264,156 B2 | 9/2012 | Cleland et al. |
| 8,290,710 B2 | 10/2012 | Cleland et al. |
| 8,433,426 B2 | 4/2013 | Cleland et al. |
| 2002/0062180 A1 | 5/2002 | Enberg |
| 2002/0152045 A1 | 10/2002 | Dowling et al. |
| 2003/0035460 A1 | 2/2003 | Tsikos et al. |
| 2003/0098353 A1 | 5/2003 | Tsikos et al. |
| 2003/0132720 A1 | 7/2003 | El Bitar |
| 2003/0155484 A1 | 8/2003 | Wiles, Jr. |
| 2004/0017158 A1 | 1/2004 | Ang et al. |
| 2004/0105264 A1 | 6/2004 | Spero |
| 2004/0130909 A1 | 7/2004 | Mueller et al. |
| 2004/0204917 A1 | 10/2004 | Williams et al. |
| 2004/0240208 A1 | 12/2004 | Beasley |
| 2005/0035720 A1 | 2/2005 | Blake |
| 2005/0054292 A1 | 3/2005 | Janusz et al. |
| 2005/0253538 A1 | 11/2005 | Shah et al. |
| 2006/0056331 A1 | 3/2006 | Ratiu et al. |
| 2006/0056363 A1 | 3/2006 | Ratiu et al. |
| 2007/0001833 A1 | 1/2007 | Sharma et al. |
| 2007/0040513 A1 | 2/2007 | Cleland et al. |
| 2007/0043540 A1* | 2/2007 | Cleland et al. ............... 702/188 |
| 2007/0043541 A1 | 2/2007 | Cleland et al. |
| 2007/0057807 A1 | 3/2007 | Walters et al. |
| 2007/0282547 A1 | 12/2007 | Howell et al. |
| 2009/0066540 A1 | 3/2009 | Marinakis et al. |
| 2009/0072944 A1 | 3/2009 | Hayward |
| 2011/0057570 A1 | 3/2011 | Cleland et al. |
| 2011/0085322 A1 | 4/2011 | Myer |

FOREIGN PATENT DOCUMENTS

| | | |
|---|---|---|
| EP | 0573323 A2 | 12/1993 |
| EP | 0669787 A1 | 8/1995 |
| GB | 2213983 A | 8/1989 |
| GB | 2224589 A | 5/1990 |
| GB | 2291993 A | 2/1996 |
| GB | 2345998 A | 7/2000 |
| GB | 2405263 A | 2/2005 |
| JP | 2003059678 | 2/2003 |
| WO | 8905536 | 6/1989 |
| WO | 9216086 | 9/1992 |
| WO | 9310591 A1 | 5/1993 |
| WO | 9802859 A1 | 1/1998 |

OTHER PUBLICATIONS

Tang, Sigmund; Non-final Office Action in U.S. Appl. No. 12/231,929; Jun. 9, 2011; U.S. Patent and Trademark Office; Alexandria, VA.

Rapp, Chad; Non-final Office Action in U.S. Appl. No. 11/479,222; Jul. 9, 2008; U.S. Patent and Trademark Office; Alexandria, VA.

Rapp, Chad; Non-final Office Action in U.S. Appl. No. 11/479,222; Feb. 20, 2009; U.S. Patent and Trademark Office; Alexandria, VA.

Rapp, Chad; Non-final Office Action in U.S. Appl. No. 11/479,222; Dec. 11, 2009; U.S. Patent and Trademark Office; Alexandria, VA.

Rapp, Chad; Non-final Office Action in U.S. Appl. No. 11/479,222; Jul. 6, 2010; U.S. Patent and Trademark Office; Alexandria, VA.

Rapp, Chad; Non-final Office Action in U.S. Appl. No. 11/479,222; Dec. 20, 2010; U.S. Patent and Trademark Office; Alexandria, VA.

Rapp, Chad; Notice of Allowance in U.S. Appl. No. 11/479,222; Nov. 23, 2011; U.S. Patent and Trademark Office; Alexandria, VA.

Vu, David; Non-final Office Action in U.S. Appl. No. 12/946,768; Jun. 9, 2011; U.S. Patent and Trademark Office; Alexandria, VA.

Vu, David; Notice of Allowance in U.S. Appl. No. 12/946,768; Jan. 3, 2012; U.S. Patent and Trademark Office; Alexandria, VA.

Don et al.; Effects of Power Line Voltage on Different Types of 400-W High Pressure Sodium Ballasts, IEEE 1997.

G. Miguel Ereu et al.; A Methodology to Determine Electrical Energy Consumption in Street Lighting Systems; IEEE; Mar. 2006, copy right 2006.

Tang, Sigmund; Non-final Office Action in U.S. Appl. No. 12/231,929; Oct. 16, 2012; U.S. Patent and Trademark Office; Alexandria, VA.

* cited by examiner

STREETLIGHT MONITORING AND CONTROL

CROSS-REFERENCE TO RELATED APPLICATIONS

This continuation patent application claims priority from U.S. patent application Ser. No. 11/899,841 filed Sep. 7, 2007, the entirety of which is hereby incorporated by reference.

TECHNICAL FIELD

This disclosure relates in general to street lighting plants or systems and more specifically to techniques and apparatus for monitoring and controlling streetlights within such systems.

BACKGROUND

Street light systems are known. Traditional methods of monitoring and controlling streetlights are relatively simple. In order to determine that a streetlight is not operating correctly, municipalities typically depend on reports from the public or a maintenance crew. Streetlights are normally turned on at night under the control of a photosensor which may be located on the streetlight or nearby or via time based contactors. Billing for the energy consumption of a streetlight is typically based on the average expected power consumption of the streetlight and the expected number of hours the streetlight will operate based on the length of the night. Maintenance of a streetlight is limited to the replacement of lamps and/or other components on a scheduled basis or when a failure is observed.

Streetlights form a major load for an electrical distribution system; especially in urban areas. It is challenging for the utility companies to bill their clients for the streetlights connected to their services. This is due to the fact that streetlights are not generally metered as are most other loads in the distribution system and thus estimates of power consumption are often used for billing purposes. Due to the diverse types of ballasts and lamps deployed, the fact that wide variations from nominal power consumption for a given type of ballast and lamp are possible, along with unpredictable line conditions and lack of actual data from different sites; power consumption estimations for streetlight plants or systems are often inaccurate. Basically billing systems currently use a standard metering mechanism which does not account for such variations. The current system of billing assumes an input power consumption for each luminaire, and it estimates the transition times based on the length of an average night and the average ballast. The inability of the current system to provide or use realistic data regarding power consumption for streetlights is affecting both the clients (cities, municipalities, etc.) and the utility companies in an adverse manner.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
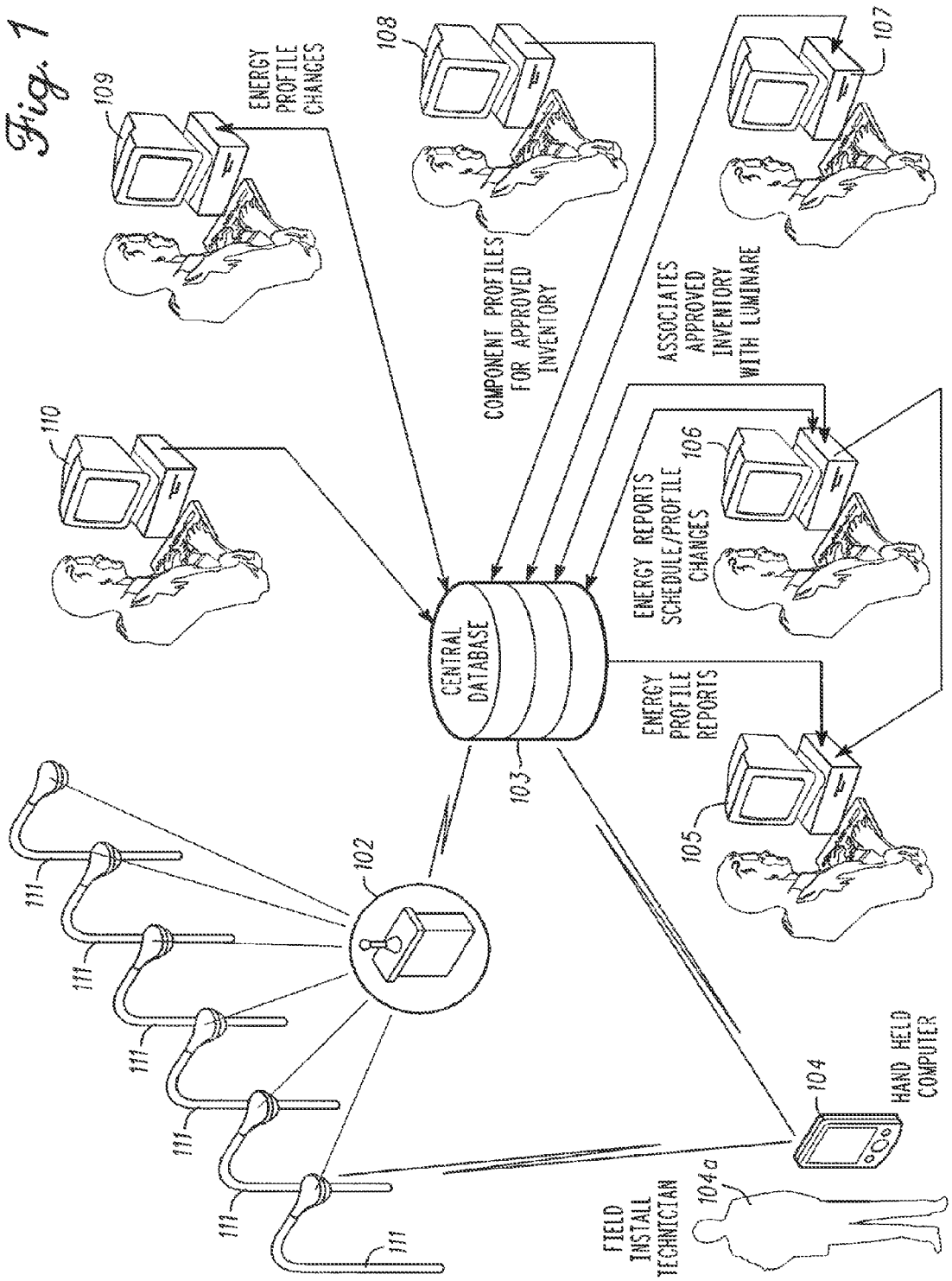
FIG. 1 depicts in a simplified and representative form, a high level diagram of a street light monitoring and control system in accordance with one or more embodiments.

In overview, the present disclosure concerns lighting monitoring and controlling systems, e.g., streetlight systems, and more specifically techniques and apparatus for providing appropriate information and using such information for controlling, maintaining, managing a system and streetlights within the system as well as other attributes that will become evident from the following discussions.

In accordance with an aspect of the present disclosure there is provided an lamp sensor mounted on an inside surface of the streetlight to sense a light level from a lamp of the streetlight; a microcontroller coupled to the lamp sensor, wherein ambient light is received by the lamp sensor when the lamp is OFF to determine when to turn ON the lamp when the ambient light level falls to a sufficient level indicative that night is approaching, the lamp sensor being utilized to sense the light from the lamp when the lamp is ON.

In accordance with another aspect of the present disclosure there is provided a method of streetlight control, the method comprising: determining an ambient light level detected by a lamp sensor positioned inside a reflector of the streetlight when the lamp is OFF, the lamp sensor primarily used to detect a lamp's light output from inside the streetlight when the lamp is ON; and turning ON the lamp when the determined ambient light level falls to a sufficient level indicative that night is approaching.

The lighting systems of particular interest may vary widely but include by way of example, outdoor systems for streets, parking, and general area lighting, indoor systems for general area lighting (malls, arenas, parking, etc), and underground systems for roadways, parking, etc. One aspect that can be particularly helpful using the principles and concepts discussed and disclosed below is improved metering (for power consumption) and controlling light levels for lighting fixtures, e.g., streetlights, luminaires, or simply lights, provided the appropriate methods and apparatus are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or integrated circuits (les) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software programs and instructions and ICs with minimal experimentation. Therefore, in the interest of brevity and minimization of any risk of obscuring the principles and concepts according to the present invention, further discussion of such software and les, if any, will be limited to the essentials with respect to the principles and concepts of the various embodiments.

The following description provides many examples in accordance with the present invention including a streetlight monitoring and control system with associated apparatus and methods. The system may be used to reduce or increase the power to the streetlight adaptively based on numerous parameters such as pedestrian conflict level, dawn and dusk times, environmental conditions etc. The system uses this methodology to provide, e.g., better metering and it also aids in tracking the performance of a streetlight plant (lighting system).

Referring to FIG. 1, a simplified and representative high level diagram of a streetlight monitoring and control system in accordance with one or more embodiments will be briefly discussed and described. FIG. 1 shows an overview of the system which allows the control of individual streetlights or a network of streetlights from a central location or multiple locations. The streetlight system 100 comprises a plurality of streetlights 111. Each streetlight 111 comprises a streetlight controller (see 201, FIG. 2), which enables, facilitates, or otherwise supports monitoring and control of the streetlight as well as communications, wired or wireless, between the streetlights and other entities, e.g., local gateway 102, etc., in the system.

Local gateway 102 communicates through an appropriate communications media (such as cell modem, wired internet, etc.) to a central controller and database 103 (alternatively referred to as a central database or central). It will be appreciated that the central controller and database can be comprised of one or more servers and databases in one or more locations that collectively operate as a repository of data and a central control point for the overall system.

Generally before the streetlights 111 are installed, the constituent elements or components, e.g., ballast, lamp, and capacitor combinations, are profiled or characterized using a component profiling station 108. The data or information collected via the component profiling station 108 is sent to the central database 103. The streetlights 111 are prepared and entered into inventory with the appropriate ballast/capacitor/lamp/etc. (component) combination by the distribution install technician 107 before they are installed. This ensures that the system knows the characteristics of a particular ballast, lamp, luminaire combination for a given configuration of streetlight 111. As the streetlights or luminaries are installed in the field by the field install technician 104a, data (data-logs and other information) for each is collected using, e.g., a hand held computing device 104 to communicate directly or through the local gateway 102 to each streetlight (via associated streetlight controller 201) and possibly the central database 103. Among other uses, the central database allows a roadway lighting engineer 109 to make schedule changes to the streetlights (ON, OFF, Levels, times, etc.). Maintenance reports may be sent to the performance contractor 110 by the central database 103. Information can be gathered and included in energy reports (metering or power consumption), which can be sent to the utility company 105 and the streetlight plant owner 106 from the central database 103.

Figure 2:
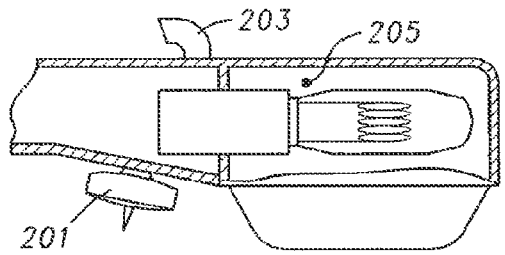
FIG. 2 in a representative form, shows a diagram of a portion of a street light suitable for use in the system of FIG. 1.

Referring to FIG. 2 a diagram of a portion of a streetlight suitable for use in the system of FIG. 1 will be briefly discussed and described. FIG. 2 shows an embodiment of the streetlight controller 201 mounted to a surface of the streetlight (alternatively streetlight fixture or luminaire). Further depicted is a day night sensor 203 that is mounted to an external surface of the streetlight and a lamp sensor 205 that is mounted to an internal surface (typically a reflector) that is adjacent to the lamp.

Each streetlight controller 201 communicates via a wireless radio (or other data communications means) to the local gateway 102. Streetlight controllers 201 may also communicate via other streetlight controllers 201 especially if the first controller 201 is out of range of the local gateway 102.

Typically, before the controllers 201 are installed in the streetlights ~11, ballast, lamp and capacitor combinations are profiled and data indicative of the profiling is provided to the central database 103. As the controller 201 is installed in each streetlight 111 and the streetlight installed, e.g., by the field-install technician 111, the hand held computing device 104 can be used to communicate with the controllers 201 directly or through the local gateway 102 and also with the central database 103 for requisite configuration and set up information. The controller 201 communicates to the local gateway 102 and sends its datalogs and other information. The local gateway 102 sends this data to the central database 103.

Figure 3:
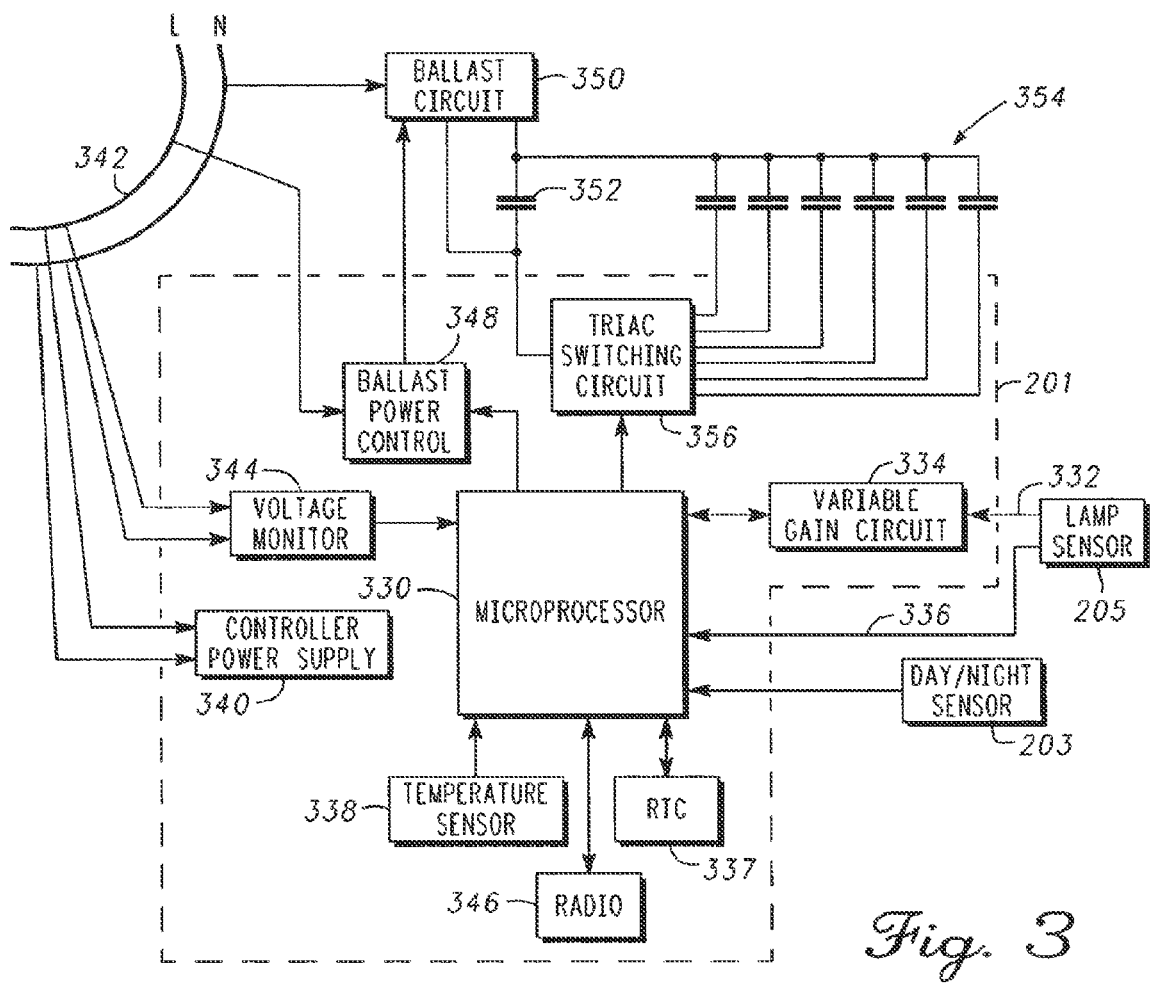
FIG. 3 depicts a representative block diagram of a controller for a streetlight in accordance with one or more embodiments.

Referring to FIG. 3, a representative block diagram of a controller 201 for a streetlight in accordance with one or more embodiments will be discussed and described. FIG. 3 depicts the streetlight controller 201 in block diagram form as it is interfaced to the system. A microprocessor or microcontroller 330 with appropriate firmware and memory controls the operation of the streetlight controller 201, stores configuration data and maintains data-logs, and processes incoming and initiates outgoing communications and messages to/from the local gateway 102, other streetlight controllers, etc. The lamp sensor 205 provides a first signal 332 that is indicative of the light intensity from the lamp within the streetlight 111. This first signal 332 is amplified by a variable gain circuit 334 before being applied to an analog to digital input of the microcontroller 330. Adjustment of the gain of the variable gain circuit 334 is controlled by the microcontroller 330. The lamp sensor also provides a second signal 336 indicative of the temperature of the lamp sensor to the microcontroller 330. This signal can be used by the microcontroller 330 to compensate for temperature and line voltage effects on the output of the lamp sensor (first signal 332).

A realtime clock circuit 337 interfaces to the microcontroller to provide time and day information to the microcontroller 330. A temperature sensor 338 provides local system temperature to the microcontroller 330. This temperature is often substantially less than the temperature of the lamp sensor 205 due to the proximity of the lamp sensor to the lamp. Controller power supply 340 interfaces to the power line 342 and provides regulated power for operation of the streetlight controller 201. A voltage monitoring circuit 344 which can comprise an appropriate resistive divider, differential amplifier, op-amp circuit, combination thereof, etc. provides the microcontroller 330 with a signal indicative of the line voltage of the power line 342.

RF wireless radio 346 which can comprise a model AC4490-100 from Aerocomm™ Inc. located in Lenexa, Kans. provides wireless communication between the microcontroller 330 in streetlight controller 201, other streetlight controllers 201 in other streetlights 111, the portable computing device 104, or the local gateway 102. Similar or identical RF wireless radios (not shown) may be present in these devices to receive and transmit data. The RF wireless radio in one streetlight 111 may relay the data to/from another RF wireless radio 346 in another streetlight 111. Thus, the streetlights and other components containing wireless radios may comprise a mesh network.

Ballast power control circuitry 348 interfaces to microcontroller 330 and responsive to the microcontroller, functions to turn a ballast circuit 350 on and off. The ballast circuit 350 regulates power applied to the lamp (not specifically shown) within the streetlight 111. The ballast circuit may interface to a base capacitance 352 and a plurality of switched capacitors 354. In addition, the microcontroller 330 interfaces through triac switching circuitry 356 to control the amount of power that is delivered to the lamp via the ballast circuit 350. The triac switching circuit together with the switching capacitors and ballast is one embodiment of a switching network which can be used to adjust or set light levels of a lamp in a streetlight. Basically, the microcontroller 330 controls the triac switching circuitry 356 to select particular ones of the switched capacitors 354 that are coupled in parallel with the base capacitance 352 and thus the total capacitance that is coupled to the ballast circuit 350. In this manner the amount of power that is delivered to the lamp is controlled or adjustable and thus the light level of the lamp can be adjusted and a particular light output or light level can be obtained. As suggested by FIG. 3, the capacitors and ballast circuit are typically not a specific part of streetlight controller 201 (although a portion may be) and typically will be contained within the body of the streetlight or luminaire.

FIG. 3 is thus illustrative of a controller 201 for a streetlight that includes a microcontroller or microprocessor, a first sensor coupled with or to the microcontroller and operative to sense a light level from a lamp within the streetlight, and a second sensor coupled with or to the microcontroller and operative to sense a voltage level of a power supply, e.g., on a power line supplying power to the streetlight or relevant portions thereof. The controller further includes a switching network that is coupled with or to the microcontroller and is operative to adjust the light level of the lamp, i.e., set the light level to a desired level based on outputs from the first and second sensors by selectively adjusting the switching network. The microcontroller is operative to facilitate an estimate of energy usage or power consumption for the streetlight (determined or calculated by the microcontroller or by another entity, e.g., the central server or database from information supplied by the microcontroller) based on the light level and the voltage level in accordance with one or more concepts further noted below. The switching network includes one or more of a plurality of switching capacitors that may be selectively used, e.g., via a triac switching circuit controllable by the microcontroller, to adjust the light level.

Figure 4:
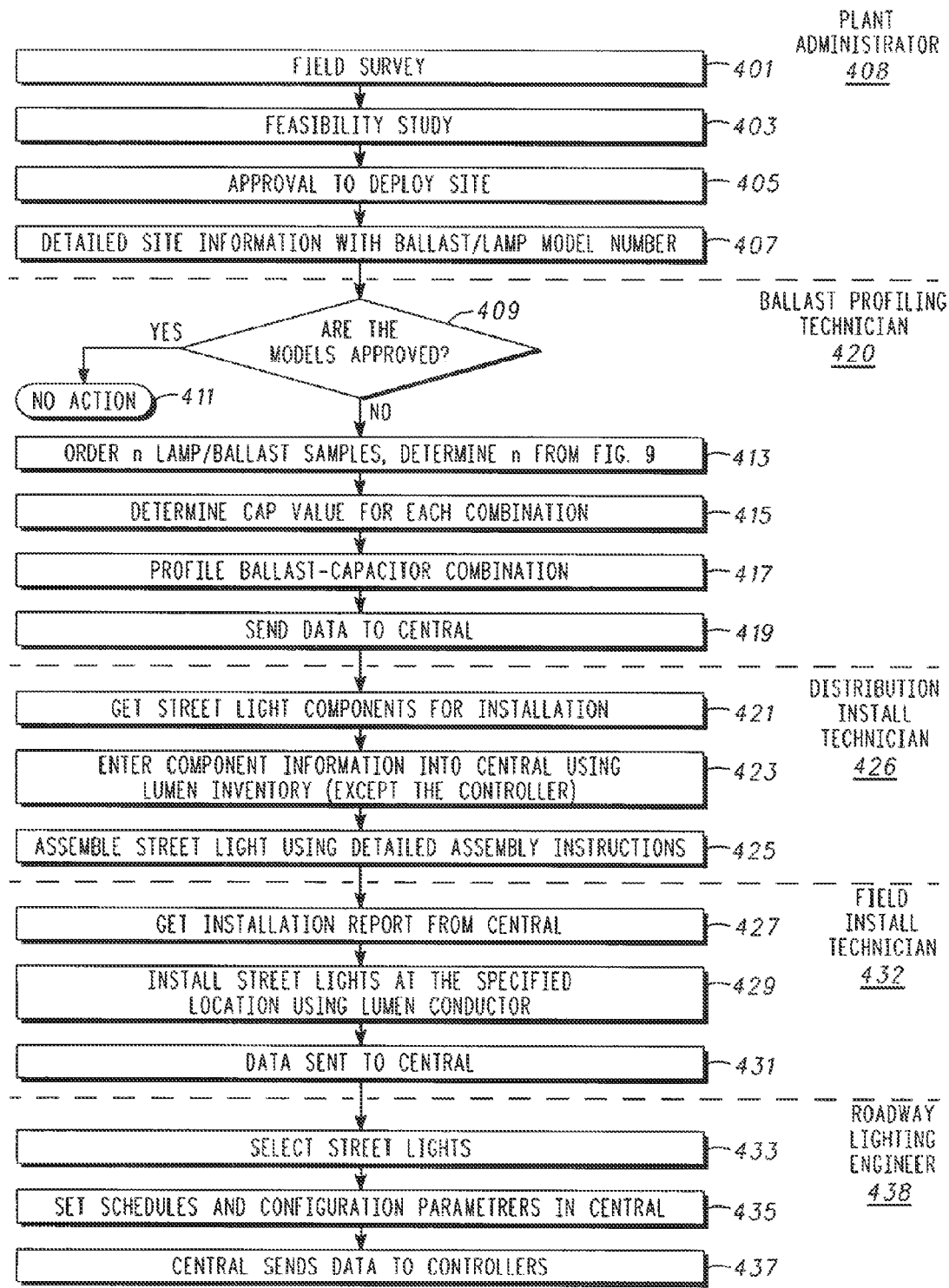
FIG. 4 depicts a representative high level flow chart which illustrates various aspects of deploying and using the system of FIG. 1 in accordance with one or more embodiments.

Referring to FIG. 4, a representative high level flow chart which illustrates various aspects of deploying and using the system of FIG. 1 in accordance with one or more embodiments will be discussed and described. Some processes associated with deployment of the FIG. 1 system or carried out by the various elements of the system 100 are shown in FIG. 4 together with one or more interested actors. When a streetlight plant owner 106 desires to install the system 100, the streetlight plant owner may perform a field survey 401 wherein potential installation and/or retrofit locations can be determined. A feasibility study may be undertaken 403 to validate the applicability of the system. Once approval is obtained 405 to deploy one or more sites, detailed information is assembled 407 for each such site. Typically the plant administrator/owner 408, 106 or agents are involved with 401-407. The detailed information for each site can comprise, e.g.:

Fixture Model number
Lamp Model number
Ballast Model Number
Manufacturer's Capacitor Model Number
Igniter Model Number
Nominal line voltage Each ballast, lamp, luminaire, etc. combination is profiled using the component profiling station 108 if the combination is not already approved 409, in which case no action is necessary 411. This includes sourcing or obtaining the appropriate combination of components 413, 415. The particular combination of components is profiled or characterized using various capacitor combinations 417. This profile or characterization data is then sent 419 to the central database 103. Once a combination has been profiled, it is not necessary for the component profiling technician to perform this process the next time this combination is slated for installation as indicated at 411. The component profiling technician 420 or the like is involved in 409-419.

Once the information on a particular combination of components is in the central database 103, the distribution install technician 426, 107 may acquire streetlight components for an installation 421. The distribution install technician enters and sends data 423 incorporating information related to components that have been acquired to the central database 103. The streetlight may then be assembled 425 by distribution install technician 426, 107.

An installation report may then be generated and obtained or provided 427 from the central database 103 for use by the field install technician 432, 104*a*. The field install technician may then install the streetlights 429 with the resulting data including streetlight controller 201 identification sent 431 to the central database 103 via the hand held device 104 (lumen conductor) or from the streetlight controller 201 and local gateway 102.

The roadway lighting engineer 438, 109 may select streetlights 433 to set schedules and configuration parameters 435 in the central database 103. The central database 103 then sends configuration data to the corresponding streetlight controllers 437. Note that various portions of the processes in FIG. 4 may be repeated as needed, e.g., for additional streetlights, etc.

Figure 5:
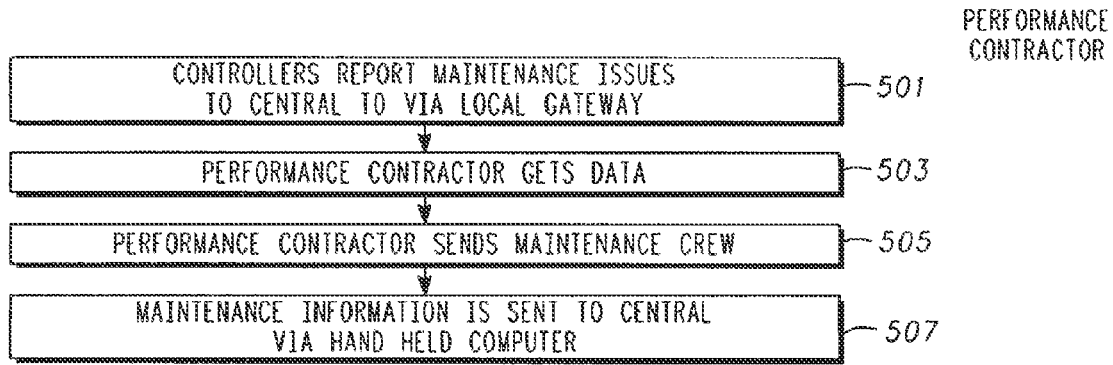
FIG. 5 and FIG. 6 illustrate flow charts for two exemplary methods using the FIG. 1 system or portions thereof in accordance with one or more embodiments.
Figure 6:
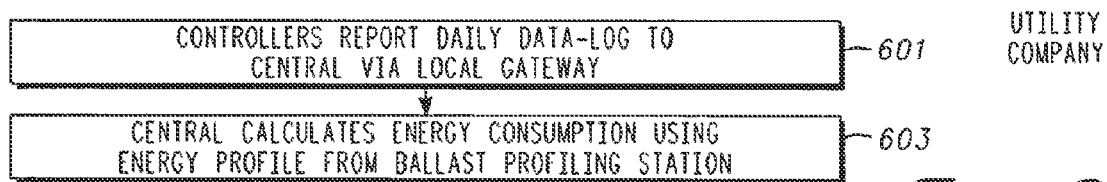

With reference to FIG. 5 and FIG. 6, flow charts for exemplary methods using the FIG. 1 system or portions thereof in accordance with one or more embodiments will be briefly described and discussed. FIG. 5 illustrates maintenance processes. During operation or initial setup of the system, streetlight controllers 201 may report maintenance issues 501 such as mis-operating lamps, etc. to the central database 103 via the local gateway 102. The performance contractor 110 can receive this information 503 and send a maintenance crew 505 to the appropriate streetlights 111. Once appropriate maintenance has been performed, this information can be sent by the performance contractor 507 to the central database 103.

FIG. 6 illustrates embodiments regarding reporting varying information. Each streetlight controller 201 can periodically, e.g., daily, responsive to an event of interest, or from time to time, e.g., when polled, report 601 information, e.g., data-logs, to the central database 103 via the appropriate local gateway (lumen station) 102 and possibly via additional streetlight controllers. The data-logs contain information regarding operational parameters such as time stamps and other information including, e.g., operating times (lamp ON/OFF times), light generation levels, line voltages, currents or similar information that includes or allows a determination of energy usage or power consumption for that streetlight for the time period covered by the data-logs. The central 103, using the data-logs determines or calculates energy usage or consumption 603 either directly or via the energy profile information, etc that were provided from the component profiling station 108 for each streetlight (a process of generating this information is described further below). These reports can be organized as desired, e.g., by time period, geographical area, consuming party (municipality, city, etc), responsible billing entity, or the like, with appropriate reports made available by the central database 103 to interested parties, e.g., utilities, system owner, operator and the like.

Figure 7:
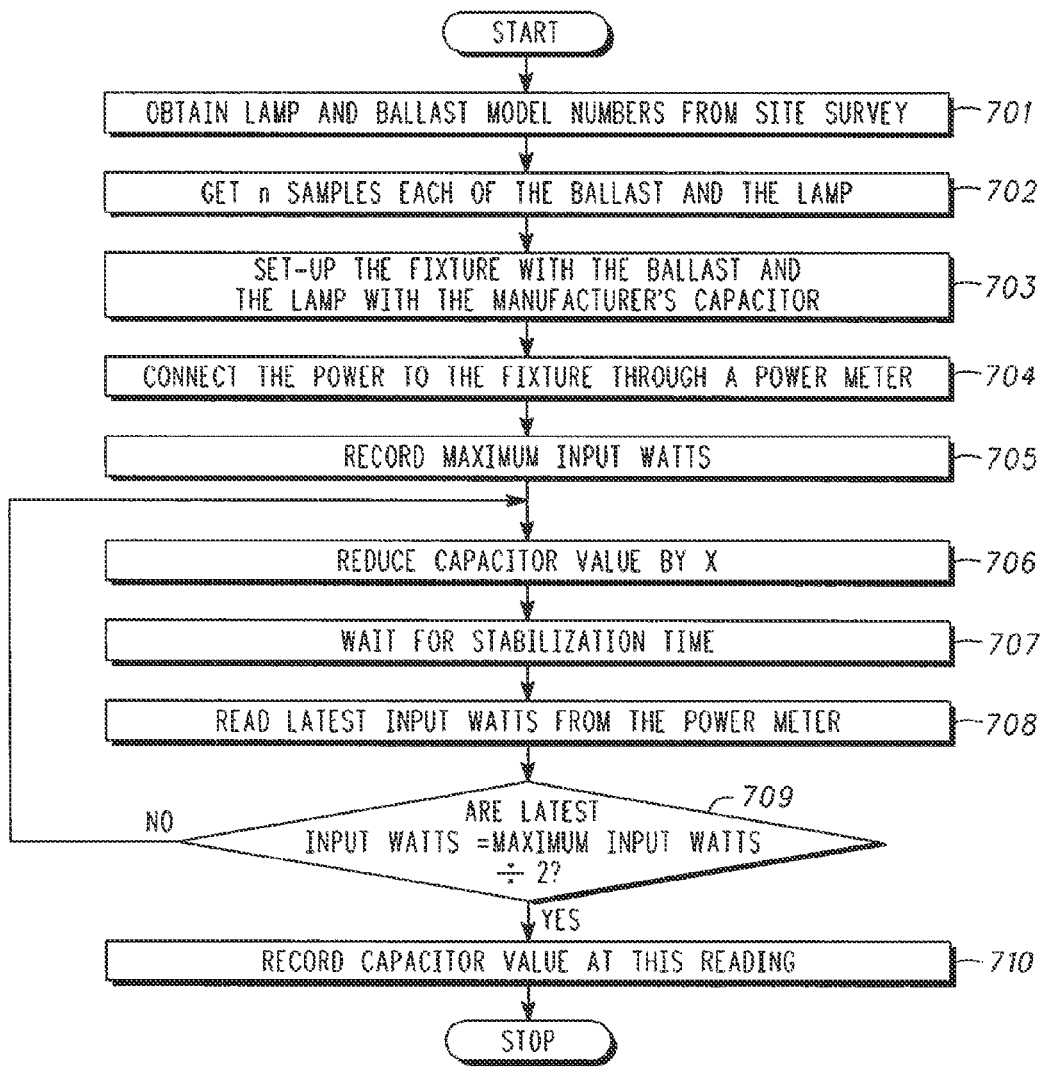
FIG. 7 illustrates a representative flow chart of processes used to determine capacitors for a street light in accordance with one or more embodiments.

Referring to FIG. 7, a representative flow chart of processes used to determine capacitors for a streetlight in accordance with one or more embodiments will be discussed and described. The following is a detailed description of one embodiment of the capacitor determination and component profiling processes described above in blocks 413 and 415.

The base capacitor 122 value may be set so that the power consumption of the ballast with the base capacitor 122 and lamp is half of the power consumption at 100% power. According to various lamp manufacturers some of the high intensity discharge (HID) lamps should not be dimmed below 50% power.

FIG. 7 shows an example process for determining the size of base capacitor 352 and switched capacitors 354 in an embodiment where 50% of the rated power usage for a given streetlight (lamp, ballast, capacitor combination) is desired. First, lamp and ballast model numbers are retrieved 701, e.g., from a site surveyor the like. A number of samples of each of these is obtained or acquired 702. This number should be large enough to be statistically significant in order that the results of the process will be applicable to all streetlights containing these components within an acceptable number of standard deviations. In one example, the number of samples may be five or more with the number being a tradeoff between efforts and time required for profiling and statistical accuracy of the results. It is noted that lamps which are used for profiling and other characterization activities should be lamps which have been stabilized, i.e., operated at full intensity for 100 hours or so.

The streetlight fixture is setup with the manufacturer's recommended capacitor 703. The fixture is then powered with the desired voltage with a power meter monitoring the power consumption of the fixture 704. After the unit has stabilized, the power consumption of the fixture is recorded 705. Once this power has been recorded, the capacitance is reduced by a fraction of the original capacitance 706. This fraction may be for example 25%. The lamp is once again powered and allowed to stabilize with the reduced capacitance 707 and a new reading of power consumption is recorded 708. If the current input watts read at 708 are approximately equal to half the maximum input watts recorded at 705 as determined at 709, the capacitance at this point is recorded 710. If not, the process continues at block 706 with a slightly smaller or larger value of capacitance depending on whether power recorded at 708 needs to decrease or increase. The final value of capacitance required to obtain an input wattage reading of approximately 50% of rated wattage, is used as the base capacitor 352 and the difference between the manufacturer's recommended capacitance and this base capacitance is used as a value for the total parallel combination of switched capacitors 354.

In one example, the first of the switched 'capacitors 354 may have a value of half of the total switched capacitance, the second one quarter and so on for a total of 6 capacitors, but the combination of switched capacitors 354 may be dependent on a particular application. This implementation allows for a total of 64 different capacitance levels (2 to the 6th power of different combinations of the capacitors) and therefore 64 different levels of brightness of the lamp within the streetlight 111.

Figure 8:
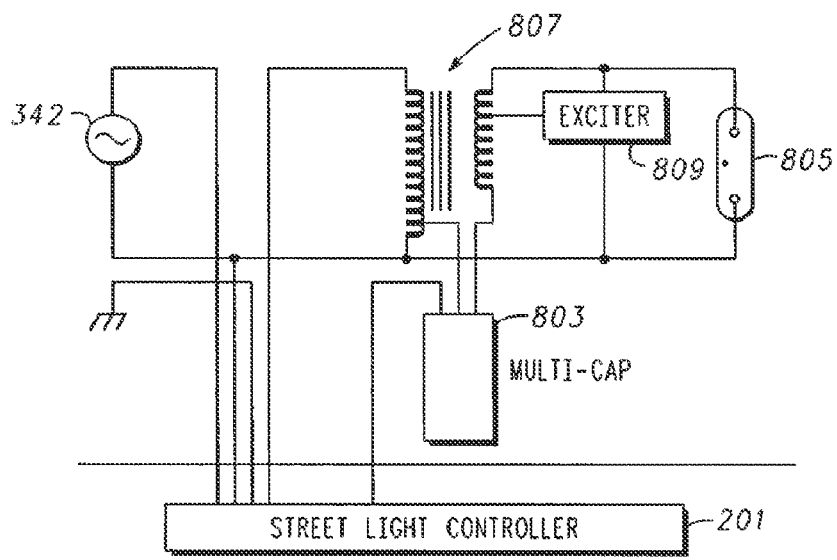
FIG. 8 shows a schematic diagram of a Constant Wattage Autotransformer (CWA) circuit for driving a lamp in a streetlight in accordance with one or more embodiments.

Referring to FIG. 8, a schematic diagram of a Constant Wattage Autotransformer (CWA) circuit for driving a lamp in a streetlight in accordance with one or more embodiments will be discussed and described. FIG. 8 depicts an example CWA streetlighting circuit. In this example, the base capacitor 352 and switched capacitors 354 have been combined into a single multiple tap capacitor 803. The lamp 805 receives regulated power from the power line 342 through ballast 807 and multiple tap capacitor 803. Exciter (or ignitor) 809 gives an initial high voltage pulse to lamp 805 at startup. The final value for the base capacitor 352 and switched capacitors 354 can be selected as the mean of the values determined over the number of lamps and ballasts tested (in the FIG. 7 example, this was five.). The streetlight controller 201 is configured to select the appropriate combination of the capacitors in the multiple tap capacitor 803 and thus provide a desired light output level.

Figure 9:
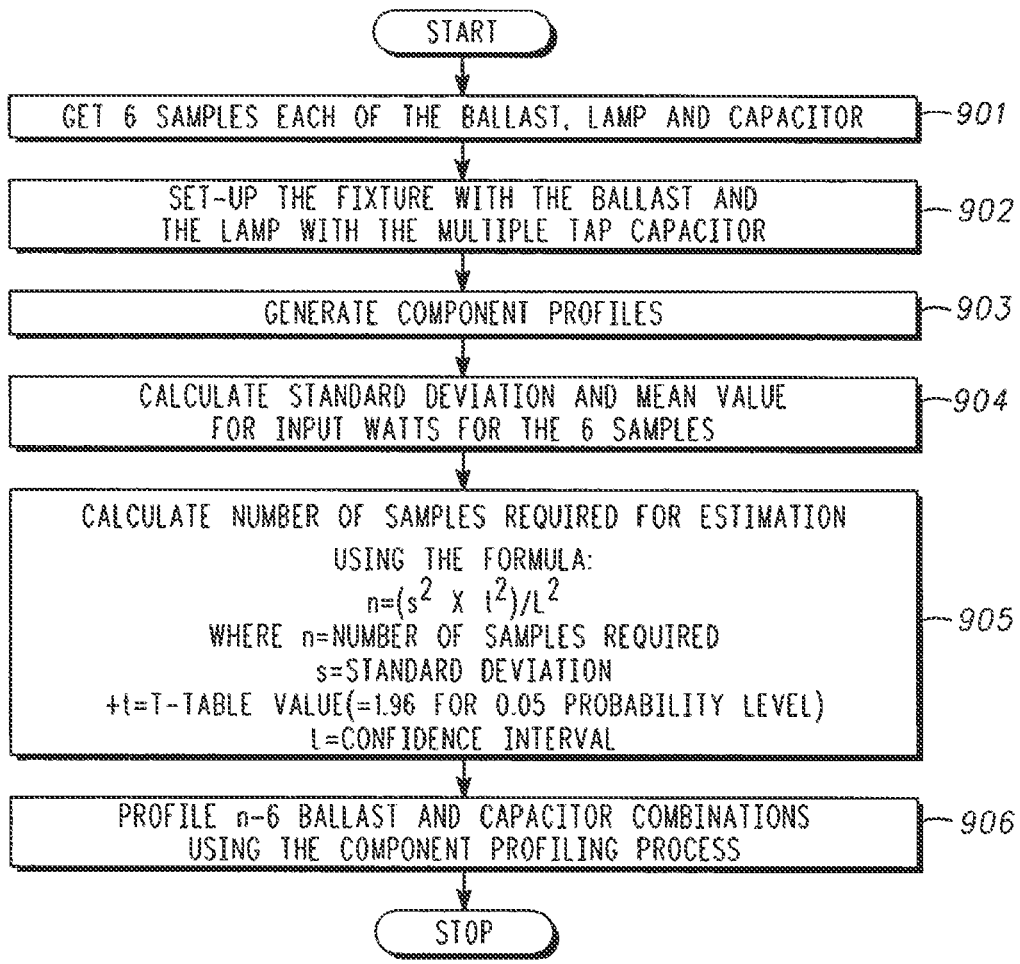
FIG. 9 illustrates a flow chart of processes associated with selecting the appropriate number of samples for profiling component combinations for streetlights in accordance with various embodiments.

Referring to FIG. 9, a flow chart of processes associated with selecting the appropriate number of samples for profiling component combinations for streetlights in accordance with various embodiments will be discussed and described. FIG. 9 depicts an example process that may be followed to determine the number of samples of a combination of ballast, lamp, capacitor that need to be profiled to allow the system to estimate power consumption and light levels for different capacitor combinations within the switched capacitors 354 for a given confidence level. First, a number (in this case six) of samples of ballast, lamp and capacitor are acquired 901. Each is setup 902 in the fixture of FIG. 11 and run 903 through the process of FIG. 10 to generate component profiles. The standard deviation and mean values of input watts for each capacitance are then calculated 904. The number of samples for a given confidence interval is then calculated using the equations and formula at 905. If this number is greater than the number of samples already profiled (in this example 6) additional samples are then profiled 906.

Figure 10:
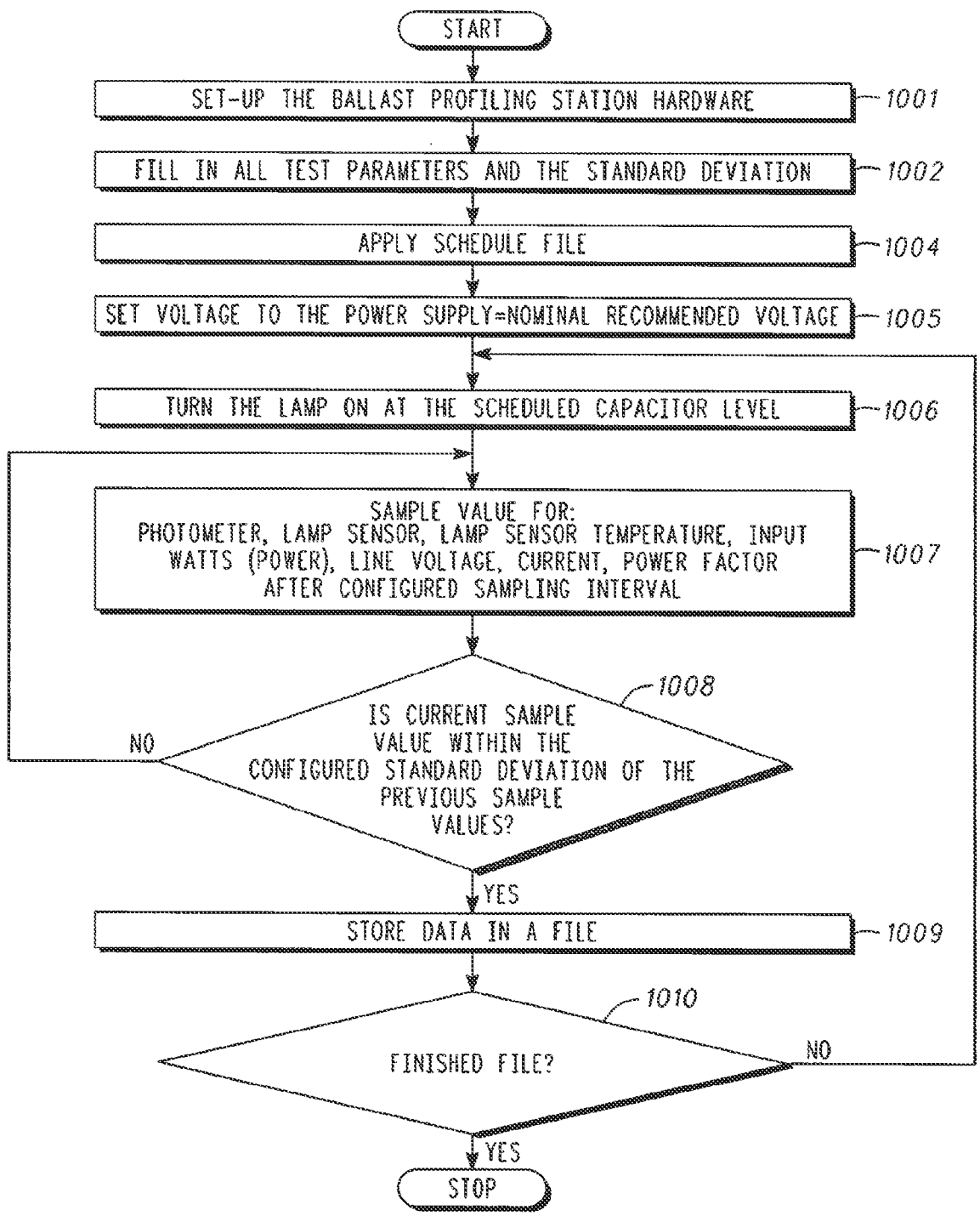
FIG. 10 illustrates a flow chart of representative methods of profiling a ballast and lamp with varying capacitors in accordance with one or more embodiments.

Referring to FIG. 10, a flow chart of representative methods of profiling a ballast and lamp with varying capacitors in accordance with one or more embodiments will be discussed and described. This process is best explained together with the setup or fixture depicted in FIG. 11. In various exemplary approaches for profiling or characterizing a particular ballast and lamp in combination with a particular value of base capacitor 352 and switched capacitors 354, the process according to FIG. 10 is practiced utilizing the setup shown in FIG. 11.

Figure 11:
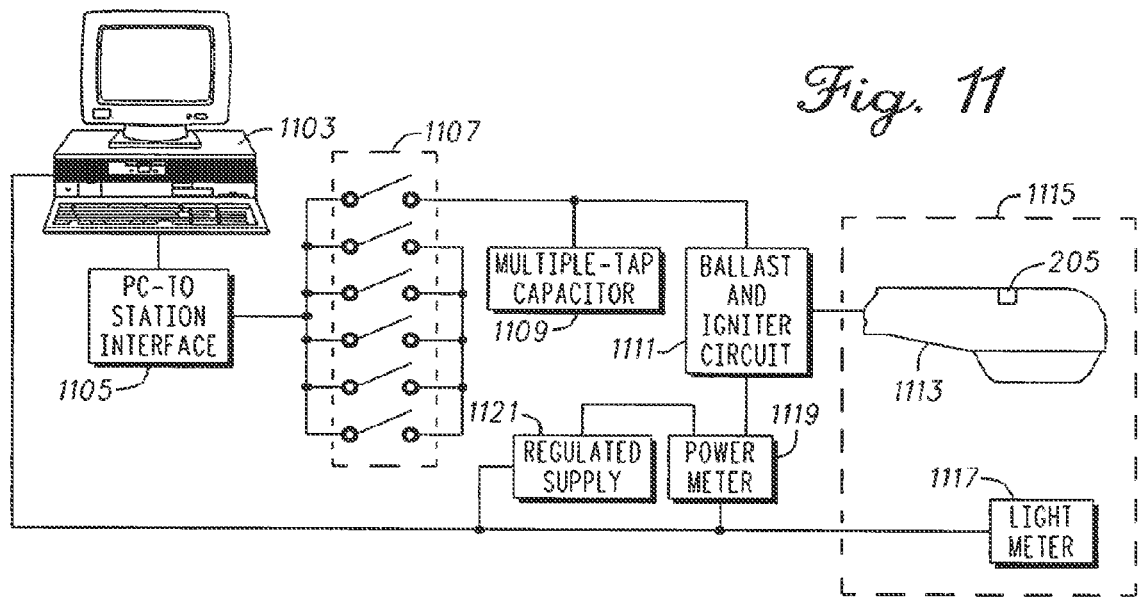
FIG. 11 shows a representative setup or fixture for use in the methods of FIG. 10.

Regarding the setup of FIG. 11, a computer 1103 controls the operation of the setup. Interface circuitry 1105 allows the computer 1103 to control switching control circuitry 1107 which allows selection of different combinations of capacitors within switched capacitors 354. In this example switched capacitors 354 and base capacitor 352 are embodied in multiple tap capacitor 1109. The streetlight circuitry 1111 including ballast and igniter drive the luminaire or lighting fixture under test 1113 which is mounted in a dark room 1115. The light output from the luminaire is directed toward a light meter 1117. The output of the light meter 1117 is interfaced to computer 1103. A power meter 1119 monitors the power consumption of the streetlight circuitry 1111 (including the lamp within 1113). Regulated supply 1121 provides power to the streetlight circuitry 1111 via power meter 1119 under the control of computer 1103.

Referring to the flow chart of FIG. 10, once the component profiling station (FIG. 11) is setup 1001, test parameters (such as voltage to use, capacitance levels to test, time durations to wait at each setting, etc.) and the standard deviation retrieved from the above setup is entered into an appropriate software control program 1002 in computer 1103. A schedule file for a number of different capacitor combinations is then started 1004. The voltage (AC voltage) of the power supply 1121 is set to the nominal voltage specified by the ballast manufacturer 1005. The lamp is then turned on with the capacitor combination selected by the computer 1103 in accordance with that presently specified in the schedule file 1006. Values from the light meter 1117, and a lamp sensor 205 (light intensity and temperature), and power meter 1119 (including input watts, line voltage, current and power factor) are sampled 1007. If the present sampled data is within the standard deviation of the previously sample data 1008, the data is recorded to a file 1009. If not, sampling continues until the sample data is stable 1007, 1008. After recording the data 1009, it is determined whether the schedule file has been completed, i.e., all test combinations have been run 1010. If not, remaining capacitor values in the schedule file may then be profiled using the same process beginning at 1006 with the next capacitor value or level.

Relationships between capacitor level and light output (measured with the lamp sensor 205 or light meter 1117), between capacitor level or value and nominal line voltage, between power consumed and nominal line voltage and between nominal line voltage and light level are determined. These relationships can be used in calculations of energy consumption from the data obtained in the field.

The process of FIG. 10 results in compensation data for a particular ballast, lamp, etc. combination based on capacitor level and for particular nominal voltage taps of the ballast. Line voltage may vary from this nominal value in the field.

Figure 12:
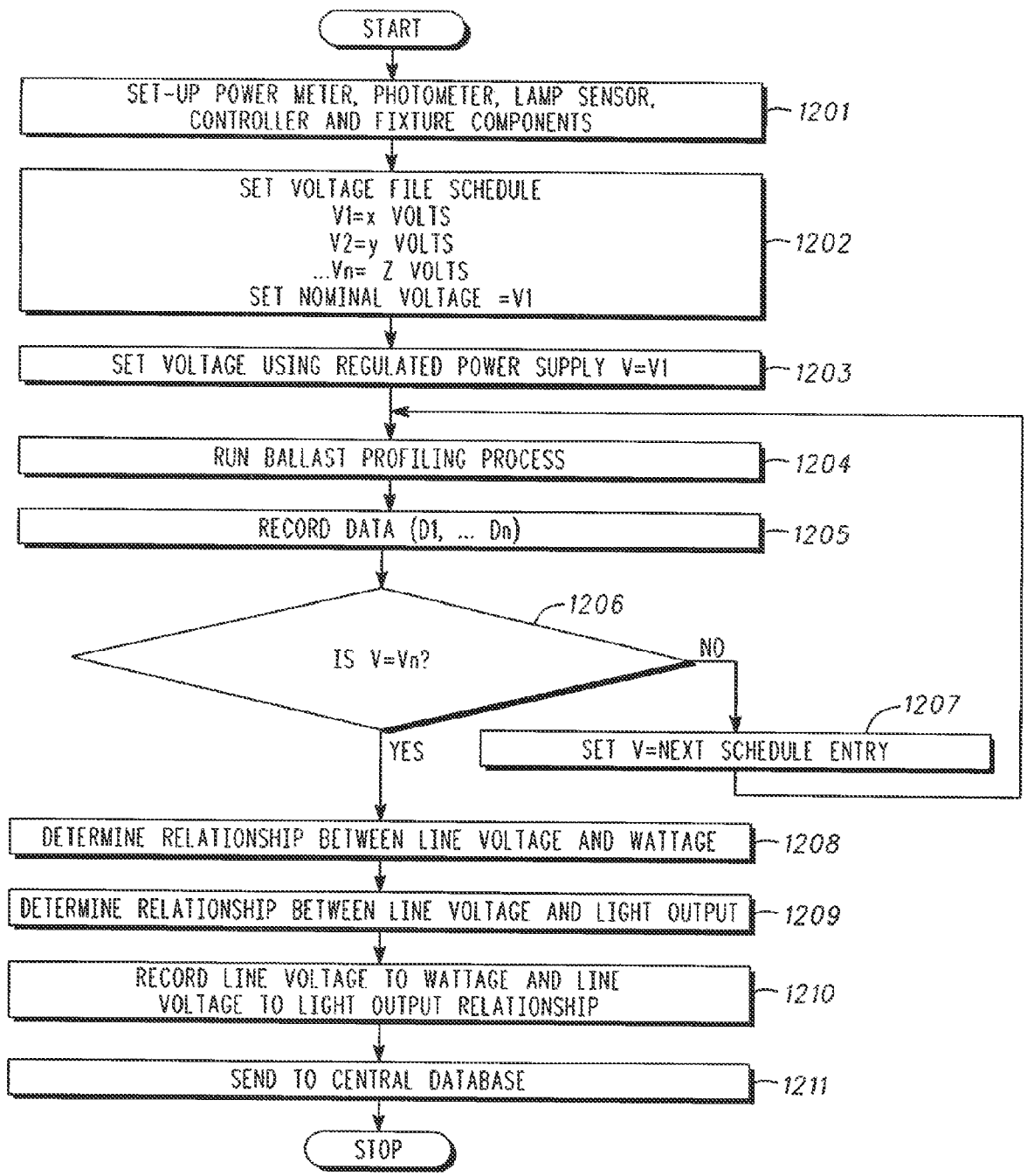
FIG. 12 illustrates a flow chart for representative methods of profiling or characterizing a streetlight with line voltage variations in accordance with one or more embodiments.

Referring to FIG. 12, a flow chart for representative methods of profiling or characterizing a streetlight with line voltage variations in accordance with one or more embodiments will be briefly discussed and described. The process illustrated in FIG. 12 may be executed to acquire compensation data for line voltage variations. As noted above with reference to FIG. 3, the streetlight controller 201 comprises voltage monitoring circuitry 344. Therefore, once appropriate compensation data for a particular ballast, lamp, etc. combination is acquired, the streetlight controller 201 or other entities (central 103, gateway 102, etc.) will be able to apply this compensation to any power consumption estimations for the streetlight 111. One or more exemplary processes associated with acquiring this compensation data is described below with reference to FIG. 12.

Initially, the apparatus of FIG. 11 is setup 1201. A voltage profile file or schedule file is created 1202, e.g., on computer 1103, comprising a number of voltages within a percentage (such as 10%) of a nominal line voltage for a particular ballast tap. The regulated supply 1121 is then set to a beginning voltage V1 1203 and the component profiling process of FIG. 10 is executed 1204. The data (see 1007) for this voltage is recorded 1205 and the process is run again for the remaining voltage levels in the file (a determination of whether any other voltages need to be used is made 1206 and if so voltage is changed 1207). After all voltages in the voltage profile file have been used and data collected, the relationship between line voltage and power consumption is determined 1208 and the relationship between line voltage and light output is also determined for a ballast, lamp, capacitor, etc. combination 1209. These values or information indicative of these relationships are then recorded 1210 and can be sent to and stored 1211 in the central database 103.

One possible way to determine the relationship between, e.g., line voltage and wattage is to assume a linear relationship. The relationship between line voltage and wattage (input watts) is calculated depending on the data-points. For a linear relationship, a method of linear regression can be used to determine the slope of the line and the intercept. According to this method, if x and y are two parameters that need to be related using a linear relationship and, if the values of x and the corresponding values of y are known, then the formula for determining the slope and the intercept for the curve is:

$$\text{SLOPE} = m = \frac{n(\sum xy) - (\sum x)(\sum y)}{n(\sum x^2) - (\sum x)^2} \qquad \text{Equation 1}$$

$$\text{Intercept} = C = \frac{\sum y - m(\sum x)}{n} \qquad \text{Equation 2}$$

To determine the relationship between line voltage and wattage, assume x=line voltage, y=wattage. Using the data collected the slope and intercept can be calculated. So, if the wattage of a lamp at a particular capacitor level is known, and the slope of the line voltage/wattage relationship is known, then the wattage can be calculated. The slope is termed as the voltage compensation coefficient. This voltage compensation coefficient may be stored in the central database 103 and used as described below with reference to FIG. 13. Thus: Actual Input Watts=Wattage at Line voltage 1−(Voltage Compensation coefficient×(Line Voltage 1−Line Voltage 2)). Similarly, the relationship between line voltage and light output can be calculated using linear regression. The light output values used could be the lamp sensor 205 values or the light meter 1117 values. Note that other approaches, e.g., a lookup table, least mean squares, etc for a best fit regression curve could also be used In the streetlight system 100, many techniques can be used to control the transition times for the streetlights 111. One example technique is to use the day/night sensor 203 to trigger the light ON and OFF for individual streetlights 111. In this case, a failing of the day/night sensor 203 will prohibit the normal operation of a streetlight 111. In addition, or as an alternative, the streetlight system may allow transitions based on dawn-dusk times. The dawn-dusk times for a particular location can be predicted if the physical location, e.g., via global positioning system (GPS) location, of the streetlight 111 is known. The GPS location (potentially with sub-meter accuracy) is programmed into the streetlight controller 201. The streetlight controller 201 performs dawn dusk calculations and triggers the streetlight to switch at the predicted dawn/dusk times with the help of the real time clock circuit 337. The real time clock circuit receives local time information via microcontroller 330 and RF wireless radio 346 from the central database 103. This mechanism ensures the proper working of streetlights on a dawn-dusk schedule even if the day/night sensor 203 has failed or is not present. The controller thus can turn the lamp ON or OFF based in part on GPS location or position.

Alternatively, the microcontroller may illuminate streetlight 111 based on a schedule of on/off times using the real time clock circuit 337. In the case where the GPS location is not available and the day/night sensor 203 is not available or becomes inoperative, the streetlighting system 100 possesses the capability to use the lamp sensor 205 as the day/night sensor. The lamp sensor 205 is positioned inside the luminaries reflector and is primarily used to detect the lamp's light output (light level). However, the streetlight controller's 201 variable gain circuit 334 may be configurable with a high enough gain to allow the lamp sensor 205 to function as a day/night sensor. Therefore, ambient light entering the streetlight 111 may be detected by the lamp sensor 205 before the streetlight 111 is turned on, i.e., until dusk. When the ambient light falls to a sufficient level, e.g., indicative of night or approaching night, the streetlight is turned ON for a determined amount of time, i.e., until dawn is expected. This time may be fixed or be based on a schedule of night durations based on the time from the real time clock circuit 337. Alternatively, the desired night duration may be received from the central database 103. Thus the streetlight controller 201 or specifically microcontroller 330 can utilize a schedule to turn the lamp ON or to turn the lamp OFF where this schedule can be stored with the microcontroller and can be modified at and received from the central database from time to time. Hence, the streetlight controller 201 can use the lamp or first sensor to sense ambient light levels and cooperatively with the microcontroller detect night and, responsive thereto, turn the lamp ON.

Neighboring streetlights 111 may cooperate in the determination of night. Since each streetlight controller 201 has a wireless radio 346, information regarding the day/night state of one streetlight 111 may be transmitted to other streetlights 111. For example, one streetlight controller 201 may comprise a day/night sensor 203 whereas others do not. In this case the first streetlight controller may transmit a message via its wireless radio 346 to other streetlight controllers to indicate transitions from day to night or visa-versa. Similarly using the day/night detection techniques described above, information as to day/night status may be transmitted between streetlights 111. Majority rules or other priority techniques may be used to ensure a group of streetlights operates consistently in the event of failure of the detection means in one or more of the streetlights 111 in a group. In this manner, the streetlight controller, specifically microcontroller can cooperate with other microcontrollers in other streetlights to determine DAY or NIGHT and responsive thereto, turn the lamp ON during night and OFF during DAY.

High pressure sodium (HPS) and other high intensity discharge lamp ballast systems may be affected by changes in the line voltage. HPS lamps react to voltage sags depending on the ballast type and the age of the lamp. Certain ballast types are more prone to the effects of voltage drops or sags. The ability of the streetlight controller 201 to monitor line voltage allows, e.g.:

real-time logging of the line voltage values;
determination if a maintenance action is caused by line voltage variations; rather than by the ballast/lamp itself. i.e., a consistently high voltage may cause premature failure of the lamp whereas a low voltage may cause lamp extinguishment even though the components of the streetlight have not reached end of life;
accounting for the change in wattage with variations in line voltage for billing purposes; and
monitoring of a significant contributor to aging of the lamp.

The streetlight system 100 allows for maintenance of light levels on the surface of a roadway over time. When the streetlight 111 is first installed, it is run at full power each night until a cumulative number of hours have expired to stabilize the characteristics of the lamp. This is accomplished by ensuring that all the capacitors within switched capacitors 354 are switched on (connected in parallel with the base capacitor 352). This may be for example 100 hours. At this point in time, the lamp within the streetlight 100 will have an output at full power that is higher than its output will be at the end of the lamp's useful life. This additional output is typically specified by the lamp manufacturer. This may be for example 20% more light than at the end of life. Due to the fact that streetlights are typically installed to a specification requiring a minimum light level, the streetlight must be capable of outputting this minimum light level at the end of life. Therefore, the extra light output at the beginning of the lamps life is excess and wastes electrical power.

Therefore, the streetlight system 100 can reduce the initial and ongoing light output of the streetlight 111 so that light output is approximately equivalent to the amount of light required (which may be a desired or maintained) output over the entire life of the lamp. This is done by measuring the lamp sensor 205 output after the initial stabilization hours have elapsed and adjusting the switched capacitors 354 that are enabled (connected) to reduce this output by a percentage (for example 20%) which can be derived from the lamp manufacturer data. Periodically, the lamp sensor 205 output is again monitored over the lifetime of the streetlight 111 and the switched capacitors 354 that are enabled are changed to maintain the lamp sensor 205 output at this level.

This technique assumes that the output of the lamp will be a percentage above the minimum after the stabilization time. But, variations in line voltage can change this percentage.

Therefore, the information from the component profiling process can be incorporated into the adjustment of the switched capacitors 354. This is described below with reference to FIG. 13. The streetlight controller can also adjust the output of the streetlight 111 to other levels (such as 50% of the maximum) and maintain this light level in a similar way.

Figure 13:
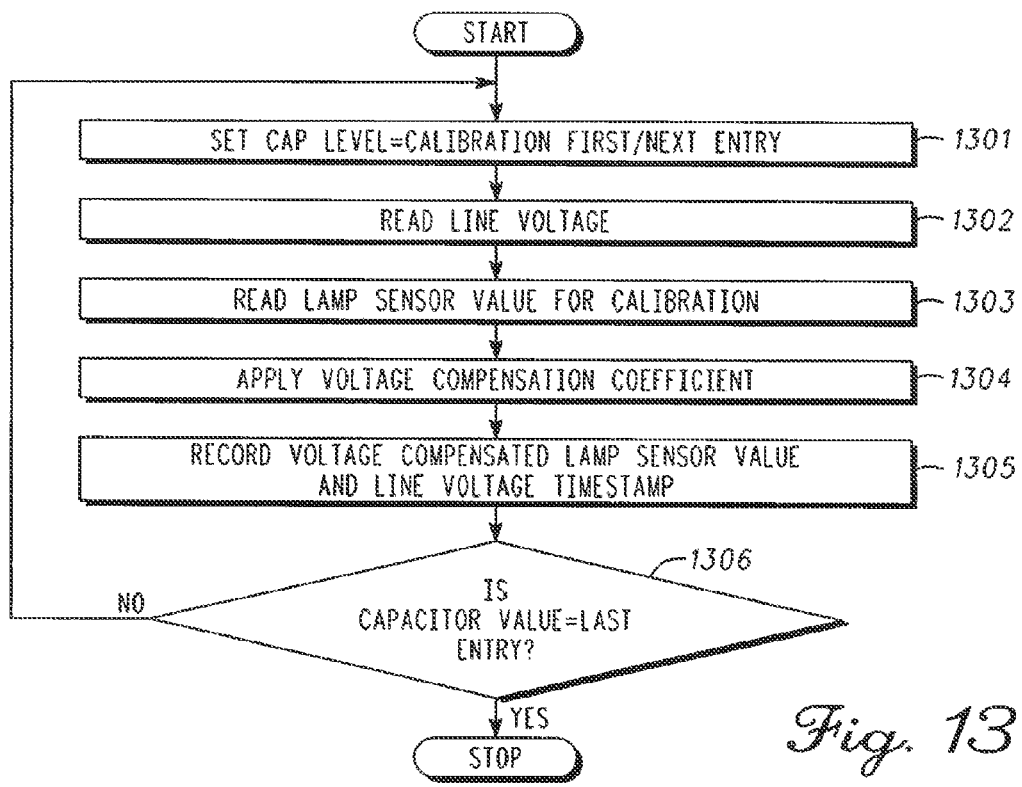
FIG. 13 illustrates a flow chart of exemplary methods of calibration of a streetlight for a line voltage in accordance with one or more embodiments.

Referring to FIG. 13, a flow chart of exemplary methods of calibration of a streetlight for a line voltage in accordance with one or more embodiments will be discussed and described. Periodically (for example once every 3 months) or from time to time, the sequence of FIG. 13 may be executed by the streetlight controller 201. The streetlight controller has a calibration sequence of switched capacitor 121 settings that may be run through. For example, 8 of a possible 64 capacitor settings may be used. The microcontroller sets the switched capacitors 121 to the first setting 1301. It then reads the line voltage using voltage monitoring circuitry 344. The lamp sensor 205 output is read 1303 and the voltage compensation coefficient (retrieved from central database 103) is applied 1304. The compensated lamp sensor 205 output and line voltage as measured is recorded 1305. This process is then repeated (starting at 1301 with the next Cap level entry) for the other switched capacitor 354 settings until all calibration settings have been used 1306. This process results in data that can be used to set the streetlight 111 to the desired brightness levels over the next period of time. For example if it is known that a voltage 5% above nominal will result in a light output 4% above nominal at full capacitance after the lamp has been operated for an initial 100 hours, the initial lamp sensor 205 output taken at the 100 hour point and with a voltage level 5% above nominal can be assumed to be 4% above that specified for the 100 hour point by the manufacturer of the lamp (or measured using the component profiling process described above). This assumed light level can then be used for future light level settings as any future output from the lamp sensor can be compared to these initial measurements. This approach recognizes that the output signal of the lamp sensor 205 may not be absolutely accurate, but may be relatively accurate.

Figure 14:
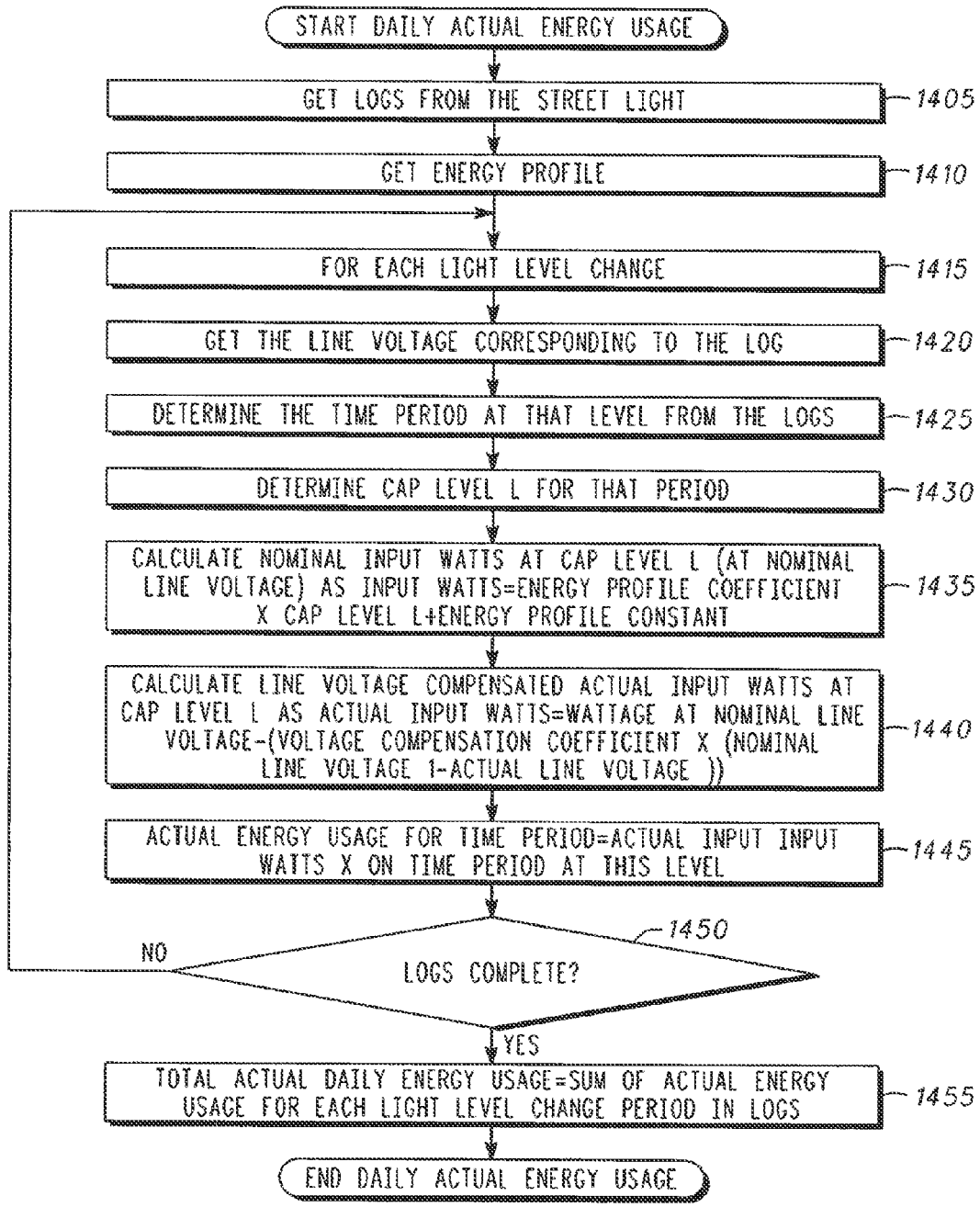
FIG. 14 shows a flow chart indicative of processes associated with determining energy usage of a streetlight in accordance with one or more embodiments.

Referring to FIG. 14, a flow chart indicative of processes associated with determining energy usage of a streetlight 111 in accordance with one or more embodiments will be discussed and described. Energy usage and savings reports may be generated from the central database 103 from time to time or upon request (by a utility company, city, etc.). The reports are generated from the data-logs obtained from the streetlight controller 201 coupled to each streetlight 111. In one or more embodiments, the streetlight controllers 201 log the ON/OFF times and corresponding voltages or voltage levels for each streetlight 111 along with the switched capacitors 354 settings for each time the streetlight is on. Given these datalogs, e.g., at the microcontroller or when these logs reach the central database, the process of FIG. 14 can be followed.

FIG. 14 shows the process that can be followed by, e.g., the streetlight controller 201, the central database 103 or a separate billing processor, etc., to determine the energy usage of a streetlight 111. After starting, the logs including ON/OFF times and switched capacitor 354 settings are retrieved 1405 from one or more streetlights 111. The energy profile applicable to the particular ballast, lamp, luminaire, etc. combination is retrieved 1410 for each streetlight of interest. The remaining discussions will focus on one streetlight although it will be appreciated that the processes described may be duplicated for additional streetlights and for additional time periods of interest. The processes represented by 1420 to 1445 are then executed for each change in light level 1415 reflected in the data-logs. The line voltage corresponding to the log entry is retrieved 1420. The time period spent at this line voltage and a given capacitor setting is retrieved 1430. The nominal input watts are calculated 1435 in accordance with the equation shown (where Energy Profile Constant may be any constant amount of power consumption unaffected by capacitor settings such as the power consumption of the streetlight controller 201) and then a compensated wattage is calculated 1440. The energy is then calculated 1445 in accordance with the equation shown. This process continues until all the relevant logs from the streetlight 111 are complete as determined at 1450. The total energy consumption for the time period is then calculated 1455 as the sum of each actual energy usage in accordance with the equation shown. This process can be repeated at or for each streetlight and from time to time (daily, monthly or the like).

Alternatively, the local gateway 102 may perform these calculations for the streetlights 111 in its area and upload this information to the central database.

Alternatively, the microcontroller 330 may perform at least a portion of the calculations necessary to estimate the power consumption of the streetlight it is housed within. For example, the microcontroller 330 may calculate volt-hours when the streetlight is illuminated, and transmit this information to the central database where additional calculations based on the above may be factored in for a final power consumption or energy estimation. In general, the process described in FIG. 14 may be split between processors present in the streetlight 111, local gateway 102 and central database 103 as appropriate for a given implementation.

The above methods and apparatus and corresponding descriptions illustrate examples of a streetlight controller, local gateway, or central controller & database being operable or operating to estimate energy usage or power consumption on a streetlight by streetlight bases, based on one or more of ON times of corresponding lamps and voltage levels sensed at the streetlights or corresponding to the ON times or during the ON times; utilization of volt-hour calculations; and component profiling information, e.g., ballast profile or lamp profile characteristics.

Figure 15:
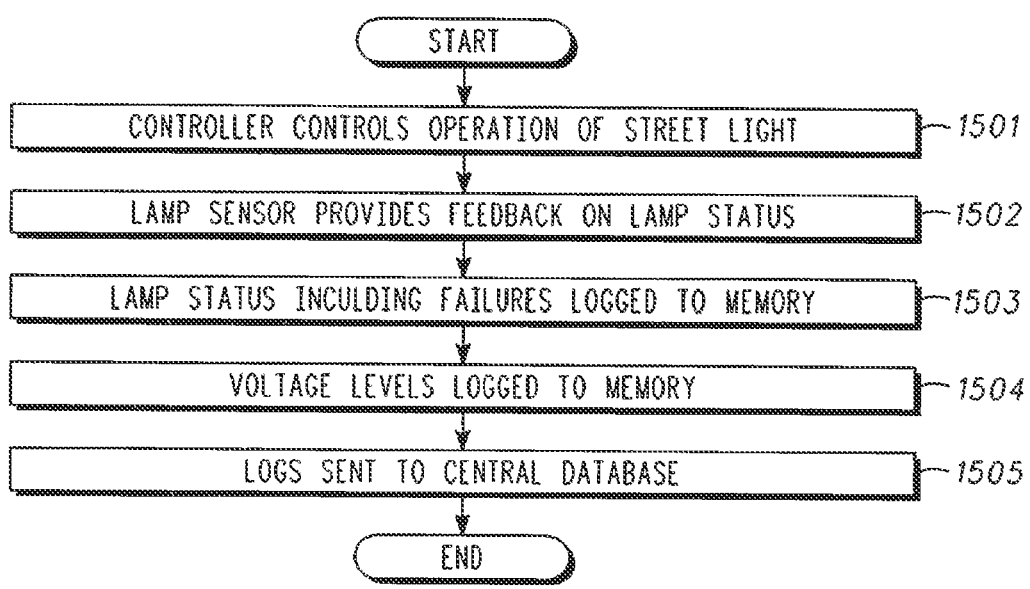
FIG. 15 shows a flow chart illustrating representative embodiments of a method of lamp monitoring in a streetlight in accordance with one or more embodiments.

Referring to FIG. 15, a flow chart illustrating representative embodiments of a method of lamp monitoring in a streetlight in accordance with one or more embodiments will be discussed and described. The streetlight system 100 also helps in tracking streetlight plant or system performance. In streetlight systems, failures occur, e.g., due to either the lamps failing or the ballast/igniter system failing. The age of the lamp and ballast systems typically determine the mortality of the streetlight systems. However, the performance of the system is also affected by the line voltage conditions in the field. The minimum operating voltage for HPS lamps can increase as they age. Hence, depending on the type of ballast used, certain lamps can be more susceptible to voltage sag. After the lamps age and if the line voltage reduces or sags, the probability of lamp failures increase. The lamps may not be able to sustain sags and consistently low input voltages after a certain age. In the existing streetlight systems, the age of the ballast and the lamp is often calculated from the date of install and the approximate ON time. Mass lamp replacement is often done when almost all the lamps are at or nearing the end of life. As no real-time data is available, there may be some lamps which are replaced before the actual end of life. In contrast with the existing streetlight systems, the adaptive lighting system periodically logs line voltages and also keeps track of the actual ON/OFF times of the luminaire.

FIG. 15 illustrates the flow of an exemplary process for such tracking. The microcontroller 330 in the streetlight controller 201 controls the lamp and ballast 350 as described previously 1501. The lamp sensor 205 provides feedback to the microcontroller regarding lamp status 1502. The microcontroller 330 processes the data and records any failures 1503 and saves it into the memory as lamp logs or data-logs. The microcontroller queries the voltage monitoring circuitry 344 and processes data periodically. The data is saved in the memory as line voltage logs 1504. The lamp logs and the line voltage logs are sent 1505 through the local gateway 102 to the central database 103.

Figure 16:
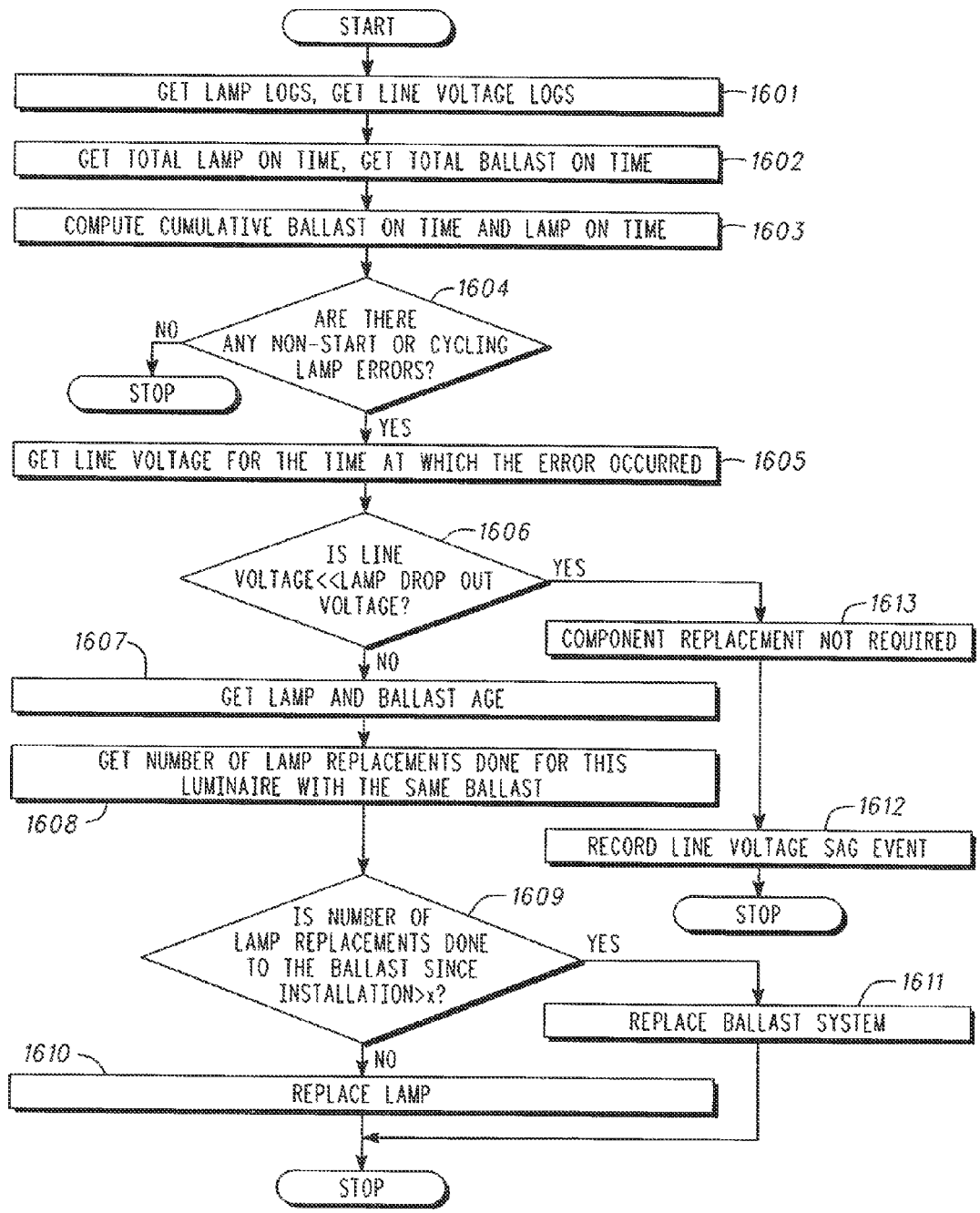
FIG. 16 shows a flow chart illustrating representative embodiments of a method of using lamp monitoring logs for a streetlight in accordance with one or more embodiments.

Referring to FIG. 16, a flow chart illustrating representative embodiments of a method of using lamp monitoring logs for a streetlight in accordance with one or more embodiments will be discussed and described. After receiving the lamp logs and the line voltage logs, the central database 103 filters out the error logs and looks for any lamp nonstart or cycling events pursuant, e.g., to facilitating appropriate maintenance. An embodiment of a process for doing so is shown in FIG. 16.

The lamp logs including on/off times, switched capacitors 354 states, and line voltage are retrieved from the central database 1601. The total lamp and ballast ON times are retrieved 1602. The cumulative ballast and lamp ON times since the ballast and/or lamp were installed is determined or computed 1603. If there are any non-start or cycling lamp errors (detected for example by the output of the lamp sensor 205 falling below or failing to rise above a threshold indicative of lamp illumination) present in the logs the process continues, otherwise it terminates 1604. If the process continues, the line voltage at the time when the error occurred is determined 1605. If this line voltage is much less (for example 20% or more below expected lamp dropout voltage) than the line voltage expected for the lamp to drop out 1606, component replacement is not required based on this log 1613 and a line voltage sag event is recorded 1612 in the central database 103. If the line voltage is not much less than the line voltage expected for the lamp to drop out, the lamp and ballast age is retrieved 1607 from the central database 103. The number of lamp replacements done for this streetlight is also retrieved 1608. If the number of lamp replacements done since the last ballast replacement is greater than a predetermined number (for example 3) 1609, the ballast system is flagged for possible replacement 1611. Otherwise, the lamp is flagged for replacement 1610.

The above discussions and FIGs illustrate various methods including methods of controlling a streetlight which comprise monitoring a light level from a lamp within the streetlight with a light sensor and monitoring a voltage level of a power supply supplying the streetlight. Further included is adjusting an output of a ballast driving the lamp to set the light level to a desired light level based on the monitoring of the light level and the voltage level. The adjusting includes, e.g., adjusting the output to a higher level when the voltage level is below a nominal level and adjusting the output to a lower level when the voltage level is above a nominal level. In various embodiments the methods can include defining a first light level from the lamp at a first time (e.g., 100 hours) after installation of the streetlight and corresponding lamp as an absolute, actual or given light level and adjusting an indication of the first light level in accordance with a difference between a first voltage level at the first time and a nominal voltage level to provide an absolute indication of the absolute light level. Thus the desired light level is relative to the absolute light level sense the indication of light level from the light sensor has been calibrated to an assumed or defined light level (absolute light level). Additionally, the method may include monitoring a temperature of the light sensor and compensating an output or indicated light level of the light sensor for the temperature of the light sensor.

Methods of monitoring a streetlight have been discussed and these methods include, e.g., monitoring a light level from a lamp within the streetlight with a light sensor, monitoring a voltage level of a power supply supplying the streetlight, and estimating the energy used or power consumption of the streetlight using, e.g., a known nominal power consumption of the streetlight, the light level and the voltage level. Estimating the power consumption can be based in part on lamp ON times or ON time durations and voltage levels at the ON times, volt-hour determinations or calculations, or streetlight component characterizations. In some instances the light levels, voltage levels, ON times, etc can be forwarded to a central controller or database or the like where the estimating power consumption is undertaken.

In summary, various apparatus and methods of monitoring or controlling one or more streetlights have been illustrated. In one exemplary embodiment, a method comprises receiving a data-log from each streetlight, with the data-log for each streetlight comprising one or more light levels and corresponding voltage levels and estimating a power consumption for each streetlight based on the one or more light levels and corresponding voltage levels. The power consumption or energy usage may further rely on or be based on one or more of component characteristics for or associated with each streetlight, lamp ON/OFF times included in data-logs for or from each streetlight. Additionally various methods of facilitating appropriate maintenance activities have been discussed. For example, the voltage levels can be utilized to distinguish between lamp cycling errors or lamp starting errors, etc which are due to lamp age versus those due to supply voltage sags or dips.

Figure 17:
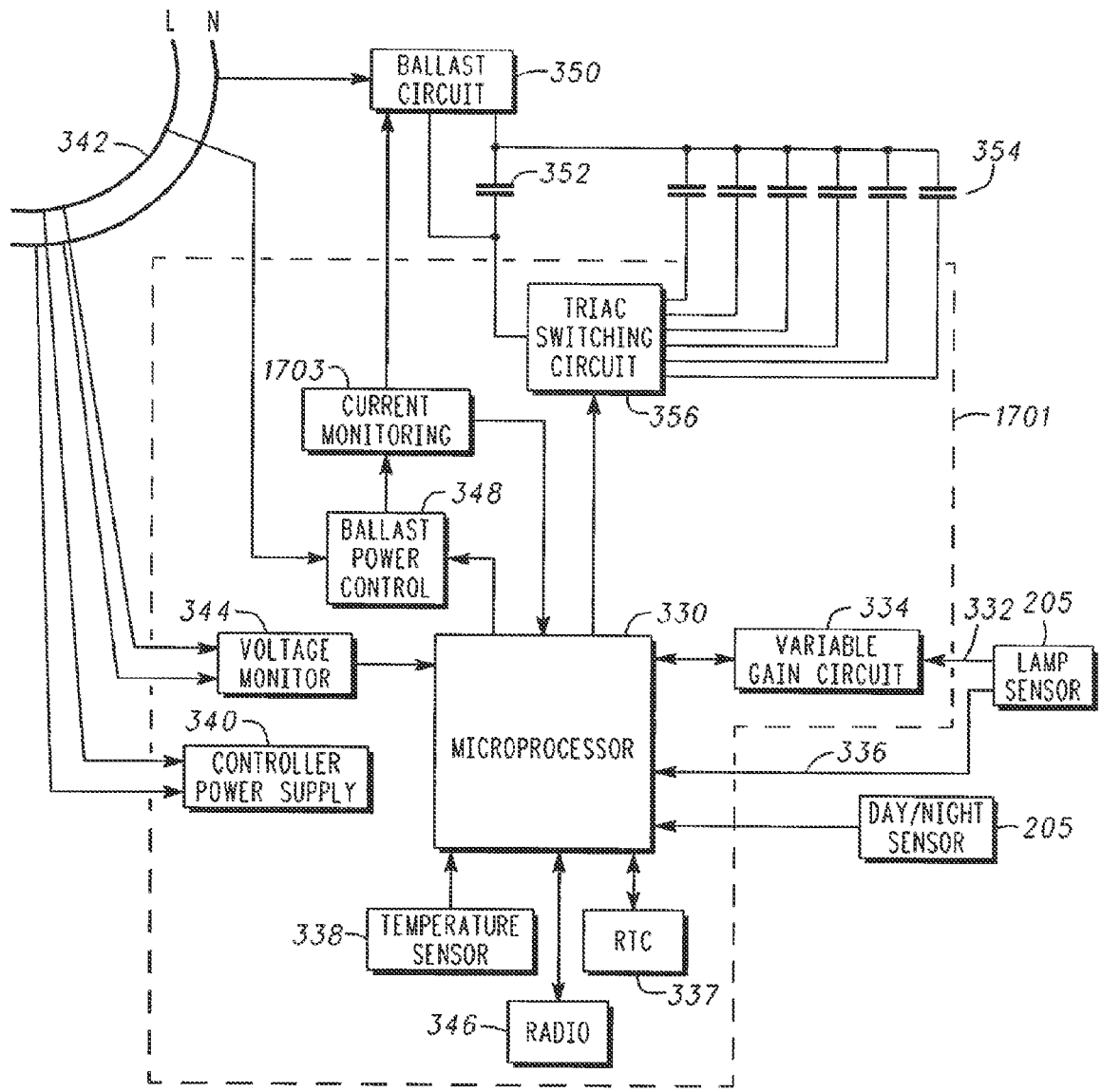
FIG. 17 depicts an alternative representative block diagram of a controller for a streetlight in accordance with one or more embodiments.

Referring to FIG. 17, an alternative representative block diagram of a controller for a streetlight in accordance with one or more embodiments will be discussed and described. FIG. 17 shows an alternate example of the streetlight controller 1701. In this example, the streetlight controller 1701 comprises current monitoring circuitry 1703 which monitors the current flowing to the ballast circuit. Alternatively, current monitoring circuitry may monitor the current flowing to both the ballast circuit 350 and the streetlight controller 1701. In this example, estimation of the power consumption of the streetlight is no longer necessary, but the remainder of the techniques, processes and apparatus previously described with reference to FIG. 3 may still be used. Current monitoring circuitry may comprise a current transformer, hall-effect device, shunt, etc. coupled with appropriate amplifier circuitry to provide a signal indicative of the current flowing to the ballast circuit 350 to microcontroller 330 which may further comprise and analog to digital converter. Samples of the signals from the voltage monitoring circuitry 344 and current monitoring circuitry 1703 may be used by the microcontroller to compute the power and/or energy usage of ballast circuit 350 and/or the ballast and streetlight controller 1701 combination. This power consumption or energy usage data, e.g., in a data-log, may then be sent via wireless RF circuitry or radio 346 via local gateway 102 to central database 103. Alternatively or additionally data indicative of the voltage and current levels can be sent to the central database 103 for one or more purposes including determination of power consumption or maintenance purposes.

Alternatively or in addition, voltage monitoring circuitry may monitor the voltage across the lamp 805 and current monitoring circuitry may monitor the current flowing through the lamp 805. This may allow the system to monitor the actual power consumption of the lamp. This information may be used to further determine energy consumption of the different components of the system and determine whether maintenance is required on various components of the system.

Many variations of the invention may be possible. For example, the streetlight controller may be configured to monitor other voltages such as lamp voltage, capacitor voltage, ballast output voltage, lamp current, etc. These readings may be used as additional inputs for estimation of power usage, ageing of the lamp, maintenance scheduling, etc. The processes, apparatus, and systems, discussed above, and the inventive principles thereof are intended to and can alleviate inaccurate power consumption issues caused by prior art techniques.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A controller for a streetlight comprising:
   a lamp sensor mounted on an inside surface of the streetlight to sense a light level from a lamp of the streetlight;
   a microcontroller coupled to the lamp sensor, wherein ambient light is received by the lamp sensor when the lamp is OFF to determine when to turn ON the lamp when the ambient light level falls to a sufficient level indicative that night is approaching, the lamp sensor being utilized to sense the light from the lamp when the lamp is ON.

2. The controller of claim 1 wherein the lamp sensor is mounted to an internal surface that is adjacent to the lamp of the streetlight.

3. The controller of claim 2 wherein the lamp sensor is used to detect ambient light when a primary day/night sensor of the streetlight is determined to be non-operative or a global positioning system (GPS) location is not available.

4. The controller of claim 3 wherein the lamp sensor provides a first signal that is indicative of the light intensity from the lamp within the streetlight when the lamp is ON.

5. The controller of claim 1 wherein the first signal is amplified by a variable gain circuit before being applied to an analog to digital input of the microcontroller, the adjustment of the gain of the variable gain circuit is controlled by the microcontroller, wherein the variable gain circuit is configurable with a high enough gain to allow the first signal of the lamp sensor to function as a day/night sensor signal.

6. The controller of claim 1 wherein the lamp sensor also provides a second signal indicative of the temperature of the lamp sensor to the microcontroller to compensate for temperature and line voltage effects on the output of the lamp sensor.

7. The controller of claim 1 wherein the lamp is turned ON by determining the ambient light by the lamp sensor, the lamp is turned ON for a determined amount of time.

8. The controller of claim 7 wherein the time is fixed or based on a schedule of night durations based on a real time clock circuit time.

9. The controller of claim 8 further comprising a wireless controller, wherein the lamp is turned ON for a desired night duration received wirelessly via the wireless controller from a central database.

10. A method of streetlight control, the method comprising:
    determining an ambient light level detected by a lamp sensor positioned inside a reflector of the streetlight when a lamp is OFF, the lamp sensor providing a first signal, the lamp sensor primarily used to detect a lamp's light output from inside the streetlight when the lamp is ON; and
    turning ON the lamp when the determined ambient light level falls to a sufficient level indicative that night is approaching.

11. The method of claim 10 wherein the lamp sensor is mounted to an internal surface that is adjacent to the lamp of the streetlight.

12. The method of claim 11 wherein the lamp sensor detects the lamp's light output when the lamp is turned ON.

13. The method of claim 12 wherein the lamp sensor provides a first signal that is indicative of the light intensity from the lamp within the streetlight when the lamp of the streetlight is ON.

14. The method of claim 13 wherein the first signal is amplified by variable gain circuit before being applied to an analog to digital input of the microcontroller, the adjustment of the gain of the variable gain circuit is controlled by the microcontroller, wherein the variable gain circuit is configurable with a high enough gain to allow the first signal of the lamp sensor to function as a day/night sensor signal.

15. The method of claim 10 wherein the lamp sensor also provides a second signal indicative of the temperature of the lamp sensor to the microcontroller to compensate for temperature and line voltage effects on the output of the lamp sensor.

16. The method of claim 10 wherein determining the ambient light detected by the lamp sensor is performed when a global positioning system (GPS) location is not available and/or or a global positioning system (GPS) location is not available.

17. The method of claim 10 further wherein determining the ambient light detected by the lamp sensor is performed when a primary day/night sensor of the streetlight is non-operative.

18. The method of claim 10 wherein the lamp is turned ON for a determined amount of time.

19. The method of claim 18 wherein the time is fixed or be based on a schedule of night durations based on a real time clock circuit time.

20. The method of claim 19 wherein the lamp is turned ON for a desired night duration received wirelessly by a wireless controller from a central database.

* * * * *